United States Patent
Bahukhandi et al.

(10) Patent No.: US 11,546,532 B1
(45) Date of Patent: Jan. 3, 2023

(54) DYNAMIC CORRELATED DOUBLE SAMPLING FOR NOISE REJECTION IN IMAGE SENSORS

(71) Applicant: Apple Inc., Cupertino, CA (US)

(72) Inventors: Ashirwad Bahukhandi, Sunnyvale, CA (US); Timothy J. Bales, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/461,782

(22) Filed: Aug. 30, 2021

Related U.S. Application Data

(60) Provisional application No. 63/161,744, filed on Mar. 16, 2021.

(51) Int. Cl.
  *H04N 5/378* (2011.01)
  *H04N 5/357* (2011.01)
  *H04N 5/369* (2011.01)

(52) U.S. Cl.
  CPC ......... *H04N 5/3575* (2013.01); *H04N 5/3698* (2013.01); *H04N 5/378* (2013.01)

(58) Field of Classification Search
  CPC .... H04N 5/357; H04N 5/3575; H04N 5/3765; H04N 5/3698; H04N 5/378
  See application file for complete search history.

(56) References Cited

U.S. PATENT DOCUMENTS

| | | | |
|---|---|---|---|
| 4,686,572 A | 8/1987 | Takatsu | |
| 4,686,648 A | 8/1987 | Fossum | |
| 5,105,264 A | 4/1992 | Erhardt et al. | |
| 5,329,313 A | 7/1994 | Keith | |
| 5,396,893 A | 3/1995 | Oberg et al. | |
| 5,471,515 A | 11/1995 | Fossum et al. | |
| 5,541,402 A | 7/1996 | Ackland | |
| 5,550,677 A | 8/1996 | Schofield et al. | |
| 5,781,312 A | 7/1998 | Noda | |
| 5,841,126 A | 11/1998 | Fossum et al. | |
| 5,880,459 A | 3/1999 | Pryor et al. | |
| 5,949,483 A | 9/1999 | Fossum et al. | |
| 6,008,486 A | 12/1999 | Stam et al. | |
| 6,040,568 A | 3/2000 | Caulfield et al. | |
| 6,233,013 B1 | 5/2001 | Hosier et al. | |

(Continued)

FOREIGN PATENT DOCUMENTS

| | | |
|---|---|---|
| CN | 1630350 | 6/2005 |
| CN | 1774032 | 5/2006 |

(Continued)

OTHER PUBLICATIONS

U.S. Appl. No. 16/805,558, filed Feb. 28, 2020, Lee et al.

(Continued)

*Primary Examiner* — Lin Ye
*Assistant Examiner* — Chriss S Yoder, III
(74) *Attorney, Agent, or Firm* — Brownstein Hyatt Farber Schreck, LLP

(57) ABSTRACT

A method of reading a pixel value from an image sensor housed with a set of components includes determining a current state of the set of components; adjusting, at least partly responsive to the current state of the set of components, a correlated double sampling (CDS) time; and performing, in accordance with the adjusted CDS time, a CDS readout of at least one pixel in a pixel array of the image sensor.

20 Claims, 16 Drawing Sheets

(56) References Cited

U.S. PATENT DOCUMENTS

| | | |
|---|---|---|
| 6,348,929 B1 | 2/2002 | Acharya et al. |
| 6,448,550 B1 | 9/2002 | Nishimura |
| 6,528,833 B2 | 3/2003 | Lee et al. |
| 6,541,751 B1 | 4/2003 | Bidermann |
| 6,670,904 B1 | 12/2003 | Yakovlev |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,931,269 B2 | 8/2005 | Terry |
| 6,956,605 B1 | 10/2005 | Hashimoto |
| 6,982,759 B2 | 1/2006 | Goto |
| 7,075,049 B2 | 7/2006 | Rhodes et al. |
| 7,084,914 B2 | 8/2006 | Van Blerkom |
| 7,091,466 B2 | 8/2006 | Bock |
| 7,119,322 B2 | 10/2006 | Hong |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,319,218 B2 | 1/2008 | Krymski |
| 7,332,786 B2 | 2/2008 | Altice |
| 7,342,270 B2 | 3/2008 | Kuwazawa |
| 7,390,687 B2 | 6/2008 | Boettiger |
| 7,415,096 B2 | 8/2008 | Sherman |
| 7,437,013 B2 | 10/2008 | Anderson |
| 7,443,421 B2 | 10/2008 | Stavely et al. |
| 7,446,812 B2 | 11/2008 | Ando et al. |
| 7,471,315 B2 | 12/2008 | Silsby et al. |
| 7,502,054 B2 | 3/2009 | Kalapathy |
| 7,525,168 B2 | 4/2009 | Hsieh |
| 7,554,067 B2 | 6/2009 | Zarnoski et al. |
| 7,555,158 B2 | 6/2009 | Park et al. |
| 7,622,699 B2 | 11/2009 | Sakakibara et al. |
| 7,626,626 B2 | 12/2009 | Panicacci |
| 7,636,109 B2 | 12/2009 | Nakajima et al. |
| 7,671,435 B2 | 3/2010 | Ahn |
| 7,728,351 B2 | 6/2010 | Shim |
| 7,733,402 B2 | 6/2010 | Egawa et al. |
| 7,737,475 B2 | 6/2010 | Hynecek |
| 7,742,090 B2 | 6/2010 | Street |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,817,198 B2 | 10/2010 | Kang et al. |
| 7,821,547 B2 | 10/2010 | Suzuki |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 7,982,789 B2 | 7/2011 | Watanabe et al. |
| 8,026,966 B2 | 9/2011 | Altice |
| 8,032,206 B1 | 10/2011 | Farazi et al. |
| 8,089,036 B2 | 1/2012 | Manabe et al. |
| 8,089,524 B2 | 1/2012 | Urisaka |
| 8,094,232 B2 | 1/2012 | Kusaka |
| 8,116,540 B2 | 2/2012 | Dean |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,174,595 B2 | 5/2012 | Honda et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,241,205 B2 * | 8/2012 | Mori .................. A61B 1/00013 600/109 |
| 8,259,228 B2 | 9/2012 | Wei et al. |
| 8,310,577 B1 | 11/2012 | Neter |
| 8,324,553 B2 | 12/2012 | Lee |
| 8,330,839 B2 | 12/2012 | Compton et al. |
| 8,338,856 B2 | 12/2012 | Tai et al. |
| 8,340,407 B2 | 12/2012 | Kalman |
| 8,350,940 B2 | 1/2013 | Smith et al. |
| 8,400,546 B2 | 3/2013 | Itano et al. |
| 8,441,545 B2 | 5/2013 | Hoda et al. |
| 8,456,540 B2 | 6/2013 | Egawa |
| 8,456,559 B2 | 6/2013 | Yamashita |
| 8,462,247 B2 | 6/2013 | Kim |
| 8,508,637 B2 | 8/2013 | Han et al. |
| 8,514,308 B2 | 8/2013 | Itonaga et al. |
| 8,520,913 B2 | 8/2013 | Dean |
| 8,546,737 B2 | 10/2013 | Tian et al. |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogua |
| 8,619,170 B2 | 12/2013 | Mabuchi |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,730,345 B2 | 5/2014 | Watanabe |
| 8,754,983 B2 | 6/2014 | Sutton |
| 8,755,854 B2 | 6/2014 | Addison et al. |
| 8,759,736 B2 | 6/2014 | Yoo |
| 8,767,104 B2 | 7/2014 | Makino et al. |
| 8,803,990 B2 | 8/2014 | Smith |
| 8,810,703 B2 | 8/2014 | Machida |
| 8,817,154 B2 | 8/2014 | Manabe et al. |
| 8,860,871 B2 | 10/2014 | Aoki |
| 8,879,686 B2 | 11/2014 | Okada et al. |
| 8,902,330 B2 | 12/2014 | Theuwissen |
| 8,902,341 B2 | 12/2014 | Mabuchi |
| 8,908,062 B2 | 12/2014 | Ito |
| 8,908,073 B2 | 12/2014 | Minagawa |
| 8,923,994 B2 | 12/2014 | Laikari et al. |
| 8,934,030 B2 | 1/2015 | Kim et al. |
| 8,936,552 B2 | 1/2015 | Kateraas et al. |
| 8,946,610 B2 | 2/2015 | Iwabuchi et al. |
| 8,981,517 B2 | 3/2015 | Oshiyama et al. |
| 8,982,237 B2 | 3/2015 | Chen |
| 8,982,260 B2 | 3/2015 | Eshraghian et al. |
| 8,988,598 B2 | 3/2015 | Ovsiannikov |
| 9,001,251 B2 | 4/2015 | Smith et al. |
| 9,041,837 B2 | 5/2015 | Li |
| 9,017,748 B2 | 6/2015 | Spelman et al. |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy |
| 9,100,597 B2 | 8/2015 | Hu |
| 9,106,859 B2 | 8/2015 | Kizuna et al. |
| 9,131,171 B2 | 9/2015 | Aoki et al. |
| 9,154,750 B2 | 10/2015 | Pang |
| 9,160,949 B2 | 10/2015 | Zhang et al. |
| 9,225,948 B2 | 12/2015 | Hasegawa |
| 9,232,150 B2 | 1/2016 | Kleekajai et al. |
| 9,232,161 B2 | 1/2016 | Suh |
| 9,270,906 B2 | 2/2016 | Peng et al. |
| 9,276,031 B2 | 3/2016 | Wan |
| 9,277,144 B2 | 3/2016 | Kleekajai et al. |
| 9,287,304 B2 | 3/2016 | Park et al. |
| 9,287,423 B2 | 3/2016 | Mori et al. |
| 9,288,380 B2 | 3/2016 | Nomura |
| 9,288,404 B2 | 3/2016 | Papiashvili |
| 9,293,500 B2 | 3/2016 | Sharma et al. |
| 9,307,161 B2 | 4/2016 | Lee |
| 9,319,611 B2 | 4/2016 | Fan |
| 9,344,649 B2 | 5/2016 | Bock |
| 9,380,245 B1 | 6/2016 | Guidash |

(56) References Cited

U.S. PATENT DOCUMENTS

| | | |
|---|---|---|
| 9,392,237 B2 | 7/2016 | Toyoda |
| 9,438,258 B1 | 9/2016 | Yoo |
| 9,445,018 B2 | 9/2016 | Fettig et al. |
| 9,451,887 B2 | 9/2016 | Watson et al. |
| 9,467,553 B2 | 10/2016 | Heo et al. |
| 9,473,706 B2 | 10/2016 | Malone et al. |
| 9,479,688 B2 | 10/2016 | Ishii |
| 9,490,285 B2 | 11/2016 | Itonaga |
| 9,497,397 B1 | 11/2016 | Kleekajai et al. |
| 9,503,616 B2 | 11/2016 | Taniguchi et al. |
| 9,521,337 B1 | 12/2016 | Shen |
| 9,538,067 B2 | 1/2017 | Hamada |
| 9,538,106 B2 | 1/2017 | McMahon et al. |
| 9,549,099 B2 | 1/2017 | Fan |
| 9,571,758 B2 | 2/2017 | Hashimoto et al. |
| 9,584,743 B1 | 2/2017 | Lin et al. |
| 9,584,744 B2 | 2/2017 | Lenchenkov et al. |
| 9,596,420 B2 | 3/2017 | Fan et al. |
| 9,596,423 B1 | 3/2017 | Molgaard |
| 9,608,024 B2 | 3/2017 | Lee et al. |
| 9,609,250 B2 | 3/2017 | Lee et al. |
| 9,654,689 B2 | 5/2017 | Gleason |
| 9,661,210 B2 | 5/2017 | Haneda |
| 9,666,618 B2 | 5/2017 | Meynants |
| 9,686,485 B2 | 6/2017 | Agranov et al. |
| 9,700,240 B2 | 7/2017 | Letchner et al. |
| 9,741,754 B2 | 8/2017 | Li et al. |
| 9,749,556 B2 | 8/2017 | Fettig et al. |
| 9,754,994 B2 | 9/2017 | Koo et al. |
| 9,774,318 B2 | 9/2017 | Song |
| 9,781,368 B2 | 10/2017 | Song |
| 9,819,890 B2 | 11/2017 | Wang et al. |
| 9,857,469 B2 | 1/2018 | Oggier et al. |
| 9,888,198 B2 | 2/2018 | Mauritzson et al. |
| 9,894,304 B1 | 2/2018 | Smith |
| 9,912,883 B1 | 3/2018 | Lee |
| 9,918,031 B2 | 3/2018 | Sakioka et al. |
| 9,936,105 B2 | 4/2018 | Furuya |
| 9,936,151 B2 | 4/2018 | Wang et al. |
| 9,952,323 B2 | 4/2018 | Deane |
| 9,973,678 B2 | 5/2018 | Mandelli et al. |
| 10,044,954 B2 | 8/2018 | Ikeda et al. |
| 10,104,318 B2 | 10/2018 | Smith |
| 10,120,446 B2 | 11/2018 | Pance et al. |
| 10,136,090 B2 | 11/2018 | Vogelsang et al. |
| 10,212,378 B2 | 2/2019 | Negishi |
| 10,217,889 B2 | 2/2019 | Dhulla et al. |
| 10,249,660 B2 | 4/2019 | Guidash et al. |
| 10,263,032 B2 | 4/2019 | Wan |
| 10,269,857 B2 | 4/2019 | Wu et al. |
| 10,271,037 B2 | 4/2019 | Oh |
| 10,285,626 B1 | 5/2019 | Kestelli et al. |
| 10,306,167 B2 | 5/2019 | Shimasaki |
| 10,334,181 B2 | 6/2019 | Guenter et al. |
| 10,379,317 B2 | 8/2019 | Shimokawa et al. |
| 10,205,904 B2 | 9/2019 | Kobayashi |
| 10,431,608 B2 | 10/2019 | Ebihara |
| 10,440,301 B2 | 10/2019 | Li et al. |
| 10,447,950 B2 | 10/2019 | Wang |
| 10,484,627 B2 | 11/2019 | Zhou |
| 10,609,348 B2 | 3/2020 | Agranov et al. |
| 10,630,920 B2 | 4/2020 | Matsunaga |
| 10,630,929 B2 | 4/2020 | Koizumi et al. |
| 10,748,955 B2 | 8/2020 | Oh et al. |
| 10,775,605 B2 | 9/2020 | Ollila |
| 10,848,693 B2 | 11/2020 | Agranov et al. |
| 10,854,647 B2 | 12/2020 | Huang |
| 10,943,935 B2 | 3/2021 | Li et al. |
| 10,943,940 B2 | 3/2021 | Wu et al. |
| 10,951,838 B2 | 3/2021 | Eyama |
| 11,019,294 B2 | 5/2021 | McMahon |
| 11,252,381 B2 | 2/2022 | Pang et al. |
| 11,258,993 B2 | 2/2022 | Hoshino |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2009/0219266 A1 | 9/2009 | Lim et al. |
| 2010/0134631 A1 | 6/2010 | Voth |
| 2011/0080500 A1 | 4/2011 | Wang et al. |
| 2011/0109776 A1 | 5/2011 | Kawai |
| 2011/0156197 A1 | 6/2011 | Tivarus et al. |
| 2011/0164162 A1 | 7/2011 | Kato |
| 2012/0092541 A1 | 4/2012 | Tuulos et al. |
| 2013/0147981 A1 | 6/2013 | Wu |
| 2014/0071321 A1 | 3/2014 | Seyama |
| 2014/0078356 A1 | 3/2014 | Vaartstra |
| 2015/0062391 A1 | 3/2015 | Murata |
| 2016/0050379 A1 | 2/2016 | Jiang et al. |
| 2016/0219232 A1 | 7/2016 | Murata |
| 2016/0344920 A1 | 11/2016 | Iwahara |
| 2017/0047363 A1 | 2/2017 | Choi et al. |
| 2021/0021778 A1 | 1/2021 | Bairo |
| 2021/0281789 A1 | 9/2021 | McMahon |
| 2022/0046196 A1 | 2/2022 | Li |

FOREIGN PATENT DOCUMENTS

| | | | | |
|---|---|---|---|---|
| CN | 1833429 | 9/2006 | | |
| CN | 1842138 | 10/2006 | | |
| CN | 1947414 | 4/2007 | | |
| CN | 101189885 | 5/2008 | | |
| CN | 101221965 | 7/2008 | | |
| CN | 101233763 | 7/2008 | | |
| CN | 101472059 | 7/2009 | | |
| CN | 101567977 | 10/2009 | | |
| CN | 101622859 | 1/2010 | | |
| CN | 101739955 | 6/2010 | | |
| CN | 101754029 | 6/2010 | | |
| CN | 101803925 | 8/2010 | | |
| CN | 102036020 | 4/2011 | | |
| CN | 102067584 | 5/2011 | | |
| CN | 102208423 | 10/2011 | | |
| CN | 102451160 | 5/2012 | | |
| CN | 102668542 | 9/2012 | | |
| CN | 102820309 | 12/2012 | | |
| CN | 102821255 | 12/2012 | | |
| CN | 103024297 | 4/2013 | | |
| CN | 103051843 | 4/2013 | | |
| CN | 103329513 | 9/2013 | | |
| CN | 103546702 | 1/2014 | | |
| CN | 104041009 | 9/2014 | | |
| CN | 104052919 | 9/2014 | | |
| CN | 204761615 | 11/2015 | | |
| CN | 205211754 | 5/2016 | | |
| EP | 814606 | 2/2002 | | |
| EP | 1763228 | 3/2007 | | |
| EP | 2023611 | 2/2009 | | |
| EP | 2107610 | 10/2009 | | |
| EP | 2230690 | 9/2010 | | |
| EP | 2512126 | 10/2012 | | |
| GB | 2601833 A | * | 6/2022 | ............ F03G 7/065 |
| JP | S61123287 | 6/1986 | | |
| JP | 2000059697 | 2/2000 | | |
| JP | 2001211455 | 8/2001 | | |
| JP | 2001358994 | 12/2001 | | |
| JP | 2004111590 | 4/2004 | | |
| JP | 2005318504 | 11/2005 | | |
| JP | 2006287361 | 10/2006 | | |
| JP | 2007504670 | 3/2007 | | |
| JP | 2007516654 | 6/2007 | | |
| JP | 2008507908 | 3/2008 | | |
| JP | 2008271280 | 11/2008 | | |
| JP | 2008543061 | 11/2008 | | |
| JP | 2009021809 | 1/2009 | | |
| JP | 4255223 | 4/2009 | | |
| JP | 2009159186 | 7/2009 | | |

(56) References Cited

FOREIGN PATENT DOCUMENTS

| | | |
|---|---|---|
| JP | 2009212909 | 9/2009 |
| JP | 2009296465 | 12/2009 |
| JP | 2010080604 | 4/2010 |
| JP | 2010114834 | 5/2010 |
| JP | 2011040926 | 2/2011 |
| JP | 2011049697 | 3/2011 |
| JP | 2011091775 | 5/2011 |
| JP | 2011216970 | 10/2011 |
| JP | 2011217315 | 10/2011 |
| JP | 2011097646 | 12/2011 |
| JP | 2012010306 | 1/2012 |
| JP | 2012019516 | 1/2012 |
| JP | 2012513160 | 6/2012 |
| JP | 2013005397 | 1/2013 |
| JP | 2013051523 | 3/2013 |
| JP | 2013070240 | 4/2013 |
| JP | 2013529035 | 7/2013 |
| KR | 20030034424 | 5/2003 |
| KR | 20030061157 | 7/2003 |
| KR | 20050103732 | 11/2005 |
| KR | 2008/0069851 | 7/2008 |
| KR | 20100008239 | 1/2010 |
| KR | 20100065084 | 6/2010 |
| KR | 20130074459 | 7/2013 |
| TW | 200520551 | 6/2005 |
| TW | 200803481 | 1/2008 |
| TW | 201110689 | 3/2011 |
| TW | 201301881 | 1/2013 |
| WO | WO 05/041304 | 5/2005 |
| WO | WO 06/014641 | 2/2006 |
| WO | WO 06/130443 | 12/2006 |
| WO | WO 07/049900 | 5/2007 |
| WO | WO 10/120945 | 10/2010 |
| WO | WO 12/053363 | 4/2012 |
| WO | WO 12/088338 | 6/2012 |
| WO | WO 12/122572 | 9/2012 |
| WO | WO 12/138687 | 10/2012 |
| WO | WO 13/008425 | 1/2013 |
| WO | WO 13/179018 | 12/2013 |
| WO | WO 13/179020 | 12/2013 |
| WO | WO 19/102887 | 5/2019 |
| WO | WO 20/228392 | 11/2020 |

OTHER PUBLICATIONS

U.S. Appl. No. 17/075,547, filed Oct. 20, 2020, Agranov et al.
U.S. Appl. No. 17/738,364, filed May 6, 2022, Rosenblum et al.
U.S. Appl. No. 17/865,128, filed Jul. 14, 2022, Bock et al.
Aoki, et al., "Rolling-Shutter Distortion-Free 3D Stacked Image Sensor with -160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.
Elgendi, "On the Analysis of Fingertip Photoplethysmogram Signals," *Current Cardiology Reviews*, 2012, vol. 8, pp. 14-25.
Feng, et al., "On the Stoney Formula for a Thin Film/Substrate System with Nonuniform Substrate Thickness," *Journal of Applied Mechanics*, Transactions of the ASME, vol. 74, Nov. 2007, pp. 1276-1281.
Fontaine, "The State-of-the-Art of Smartphone Imagers," 2019 International Image Sensor Workshop, Snowbird, Utah, Jun. 23-27, 2019, 3 pages.
Fu, et al., "Heart Rate Extraction from Photoplethysmogram Waveform Using Wavelet Multi-resolution Analysis," *Journal of Medical and Biological Engineering*, 2008, vol. 28, No. 4, pp. 229-232.
Han, et al., "Artifacts in wearable photoplethysmographs during daily life motions and their reduction with least mean square based active noise cancellation method," *Computers in Biology and Medicine*, 2012, vol. 42, pp. 387-393.
Jang et al., "A new PDAF correction method of CMOS image sensor with Nonacell and Super PD to improve image quality in binning mode," IS&T International Symposium on Electronic Imaging 2021, Image Quality and System Performance XVIII, 5 pages.
Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.
Santos, et al., "Accelerometer-assisted PPG Measurement During Physical Exercise Using the LAVIMO Sensor System," *Acta Polytechnica*, 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.
Schwarzer, et al., On the determination of film stress from substrate bending: Stoney's formula and its limits, Jan. 2006, 19 pages.
Shen et al., "Stresses, Curvatures, and Shape Changes Arising from Patterned Lines on Silicon Wafers," Journal of Applied Physics, vol. 80, No. 3, Aug. 1996, pp. 1388-1398.
Yan, et al., "Reduction of motion artifact in pulse oximetry by smoothed pseudo Wigner-Ville distribution," *Journal of NeuroEngineering and Rehabilitation*, 2005, vol. 2, No. 3, pp. 1-9.
Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

* cited by examiner

DYNAMIC CORRELATED DOUBLE SAMPLING FOR NOISE REJECTION IN IMAGE SENSORS

CROSS-REFERENCE TO RELATED APPLICATION

This application is a nonprovisional of, and claims the benefit under 35 U.S.C. § 119(e) of, U.S. Provisional Patent Application No. 63/161,744, filed Mar. 16, 2021, the contents of which are incorporated herein by reference as if fully disclosed herein.

FIELD

The described embodiments generally relate to image sensors, and to the sensing of electromagnetic radiation (e.g., light) by an array of pixels. More particularly, the described embodiments relate to readout of a pixel using a correlated double sampling (CDS) readout circuit.

BACKGROUND

Devices such as smartphones, tablet computers, digital cameras, and robotic and vehicle navigation systems often include image sensors. In some image sensors, each pixel of the image sensor may include a photodetector and a set of transistors. The set of transistors may be used, for example, to reset the pixel, transfer a photo-generated charge within the pixel, and read out a value corresponding to the photo-generated charge. In some cases, the set of transistors may couple the pixel to a CDS readout circuit. The CDS readout circuit enables both a reference value (corresponding to noise) and a data value (corresponding to a photo-generated charge plus noise) to be read out of a pixel. The reference value may be subtracted from the data value to cancel noise from the data value.

SUMMARY

Embodiments of the systems, devices, methods, and apparatus described in the present disclosure are directed to image sensors and the sensing of electromagnetic radiation. More particularly, the described embodiments relate to readout of a pixel using a CDS readout circuit. As described herein, the CDS time of a CDS readout circuit may be dynamically adjusted. In particular, the CDS time may be adjusted at least partly in response to a current state of a set of components, which components may generate intermittent or time-varying noise (e.g., electrical noise or magnetic noise) having different frequencies that interfere with a CDS readout. Adjusting the CDS time so that the CDS frequency is synced with a current frequency of the noise can provide improved noise cancelation and other advantages.

In a first aspect, the present disclosure describes an electronic device. The electronic device may include an image sensor and a set of components operable to generate at least one of an electrical signal or a magnetic signal. The image sensor may include a pixel array, a CDS readout circuit associated with a pixel in the pixel array, and an image sensor driver coupled to the pixel array and the CDS readout circuit. The image sensor driver may be configured to receive an indication of a current state of the set of components and adjust a CDS time of the CDS readout circuit at least partly responsive to the indication of the current state of the set of components.

In a second aspect, the present disclosure describes a method of reading a pixel value from an image sensor housed with a set of components. The method may include determining a current state of the set of components; adjusting, at least partly responsive to the current state of the set of components, a CDS time; and performing, in accordance with the adjusted CDS time, a CDS readout of at least one pixel in a pixel array of the image sensor.

In a third aspect, the present disclosure describes a CDS readout circuit. The CDS readout circuit may include a timing generator and an analog-to-digital converter (ADC). The ADC may be configured to receive an analog pixel value, a reference ramp start signal from the timing generator, and a data ramp start signal from the timing generator. The CDS readout circuit may further include a programmable delay circuit configured to selectively add a delay to the data ramp start signal, and an image sensor driver configured to program the programmable delay circuit at least partly responsive to a frequency of a noise signal. The delay to the data ramp start signal adjusts a CDS time of the CDS readout circuit.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
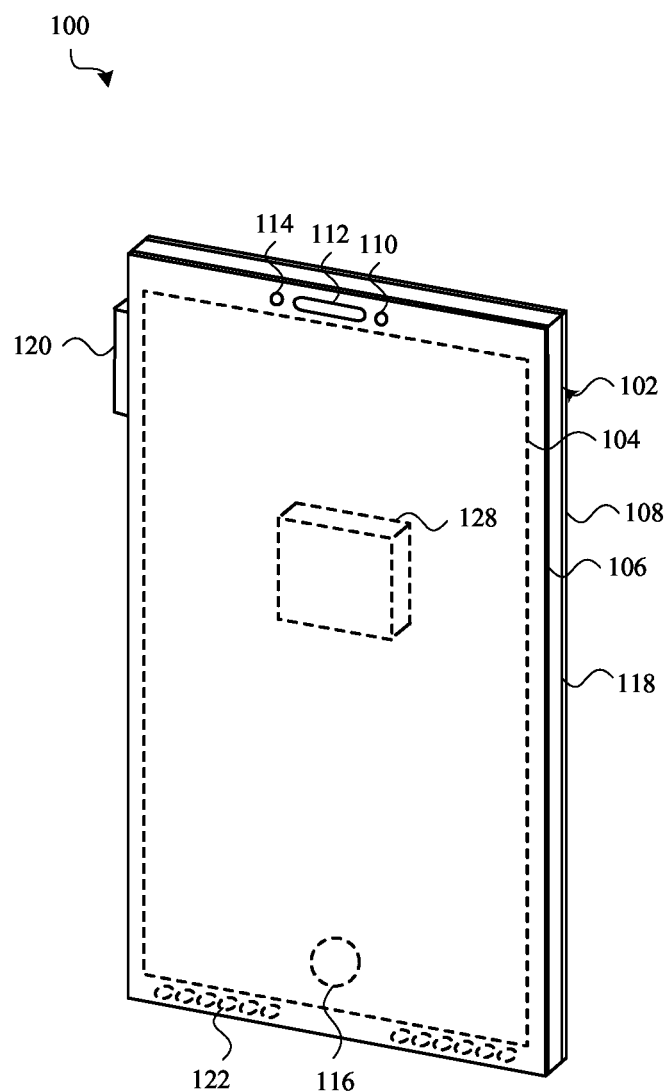
FIGS. 1A and 1B show an example of a device that may include an image sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments and appended claims.

Correlated double sampling (CDS) is a pixel readout technique that can be used to provide noise cancelation. In accordance with a CDS readout, a reference value and a data value are both read out of a pixel during a read cycle. The reference value is read out of the pixel by decoupling the pixel's photodetector from its sense region (e.g., a floating diffusion node) and reading a charge that is accumulated by the sense region as a result of noise. The noise may include, for example, baseline noise, kt/C noise, signal path offset, and other noise. The data value is read out of the pixel after coupling the pixel's photodetector to its sense region, and is generally representative of a photo-generated charge accumulated by the photodetector. Because, the data value includes the same noise that is included in the reference value, this noise may be removed from the data value by subtracting the reference value from the data value.

One type of noise that CDS does not inherently cancel is noise that changes in frequency over time. For example, a device that includes an image sensor may also include one or more of wireless communications circuitry, a charging circuit, a power delivery system, and/or an audio output device. When the wireless communications circuitry is operated in a first wireless communication mode, the wireless communications circuitry may generate signals that, in the context of the image sensor, generate noise having a first frequency. When the wireless communications circuitry is operated in a second wireless communication mode, the wireless communications circuitry may generate signals that, in the context of the image sensor, generate noise having a second frequency (with the second frequency being different from the first frequency). When the wireless communications circuitry is operated in the first wireless communication mode while the charging circuit is active, the image sensor may experience aggregate noise having a third frequency (with the third frequency being different from both the first and second frequencies). All of the noises referenced in this paragraph may be referred to herein as aggressor noise. Aggressor noise may also include other noises.

When a CDS readout circuit reads reference and data values at times that are not synced with a frequency or period of an aggressor noise, the reference and data values may include different amounts of the aggressor noise, and a CDS readout circuit will not fully cancel the aggressor noise from a data value (also referred to herein as a pixel value). The systems, devices, methods, and apparatus described in the present disclosure therefore sync the timing of reference and data value reads with the frequency of an aggressor noise, and dynamically adjust the timing of the CDS readout as the frequency (or aggregate frequency) of aggressor noise changes.

In one embodiment, the present disclosure describes an electronic device that includes an image sensor, and a set of components operable to generate at least one of an electrical signal or a magnetic signal. The image sensor may include a pixel array, a CDS readout circuit associated with a pixel in the pixel array, and an image sensor driver coupled to the pixel array and the CDS readout circuit. The image sensor driver may be configured to receive an indication of a current state of the set of components and adjust a CDS time of the CDS readout circuit at least partly responsive to the indication of the current state of the set of components.

These and other embodiments are described with reference to FIGS. 1A-13. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

Figure 1B:
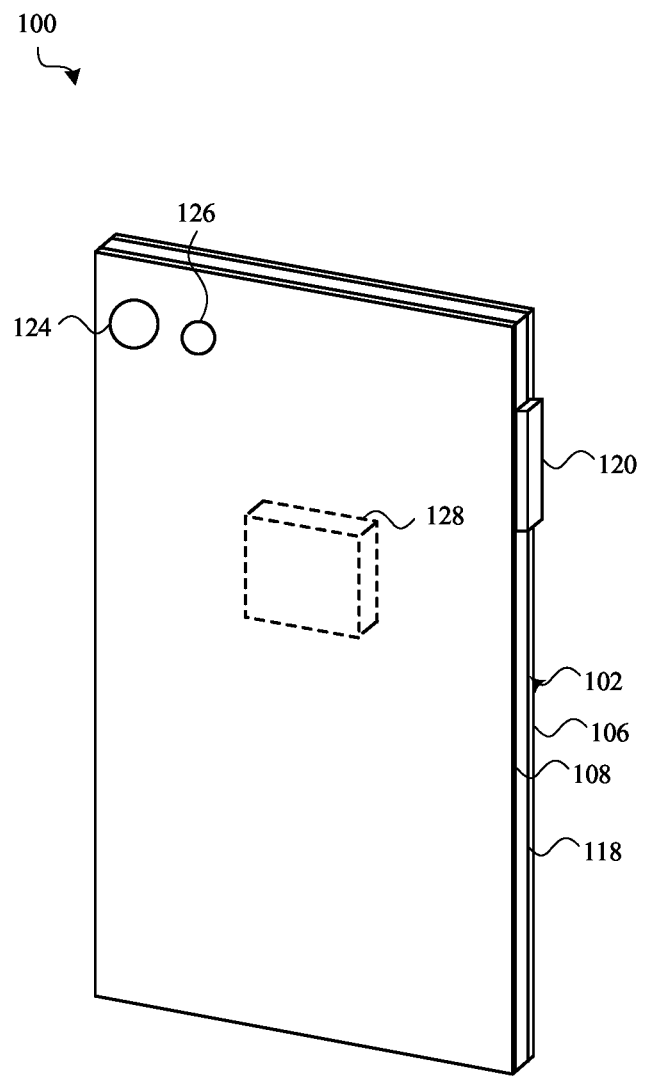

FIGS. 1A and 1B show an example of a device 100 that may include an image sensor. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example a mobile phone, tablet computer, portable computer, portable music player, wearable device (e.g., an electronic watch, health monitoring device, or fitness tracking device), augmented reality (AR) device, virtual reality (VR) device, mixed reality (MR) device, gaming device, portable terminal, digital single-lens reflex (DSLR) camera, video camera, vehicle navigation system, robot navigation system, or other portable or mobile device. The device 100 could also be a device that is semi-permanently located (or installed) at a single location. FIG. 1A shows a front isometric view of the device 100, and FIG. 1B shows a rear isometric view of the device 100. The device 100 may include a housing 102 that at least partially surrounds a display 104. The housing 102 may include or support a front cover 106 or a rear cover 108. The front cover 106 may be positioned over the display 104, and may provide a window through which the display 104 may be viewed. In some embodiments, the display 104 may be attached to (or abut) the housing 102 and/or the front cover 106. In alternative embodiments of the device 100, the display 104 may not be included and/or the housing 102 may have an alternative configuration.

The display 104 may include one or more light-emitting elements, and in some cases may be a light-emitting diode (LED) display, an organic LED (OLED) display, a liquid crystal display (LCD), an electroluminescent (EL) display, or another type of display. In some embodiments, the display 104 may include, or be associated with, one or more touch and/or force sensors that are configured to detect a touch and/or a force applied to a surface of the front cover 106.

The various components of the housing 102 may be formed from the same or different materials. For example, a sidewall 118 of the housing 102 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The rear cover 108 may be formed using the same material(s) that are used to form the sidewall 118 or the front cover 106. In some cases, the rear cover 108 may be part of a monolithic element that also forms the sidewall 118 (or in cases where the sidewall 118 is a multi-segment sidewall, those portions of the sidewall 118 that are conductive or non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume above, below, and/or to the side of the display 104 (and in some cases within the device stack). The force sensor (or force sensor system) may be triggered in response to the touch sensor detecting one or more touches on the front cover 106 (or a location or locations of one or more touches on the front cover 106), and may determine an amount of force associated with each touch, or an amount of force associated with a collection of touches as a whole. In some embodiments, the force sensor (or force sensor system) may be used to determine a location of a touch, or a location of a touch in combination with an amount of force of the touch. In these latter embodiments, the device 100 may not include a separate touch sensor.

As shown primarily in FIG. 1A, the device 100 may include various other components. For example, the front of the device 100 may include one or more front-facing cameras 110 (including one or more image sensors), speakers 112, microphones, or other components 114 (e.g., audio, imaging, and/or sensing components) that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be accessible from the front surface (or display surface) of the device 100.

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter concentration sensor, or air quality sensor may be positioned in or near a port 122.

In some embodiments, the rear surface of the device 100 may include a rear-facing camera 124 that includes one or more image sensors (see FIG. 1B). A flash or light source 126 may also be positioned on the rear of the device 100 (e.g., near the rear-facing camera). In some cases, the rear surface of the device 100 may include multiple rear-facing cameras.

The device 100 may include a set of components for performing various functions, including, for example, communication, sensing, location-finding, charging, powering, and processing functions. The components that perform these and other functions are generally identified by box 128, but may be larger or smaller than box 128, and may be concentrated within a particular region or regions of the device 100 or distributed throughout the device 100. In some cases, the set of components may include wireless communications circuitry, a charging circuit, a power delivery system, and/or an audio output driver (e.g., for speaker 112).

The components designated by box 128, and/or other components, may generate various signals. The signals may include electrical signals, magnetic signals, and so on. Some of the signals may be generated continuously. Other signals may be generated intermittently. As an example, the wireless communications circuitry may generate a first carrier signal for transmitting over a first wireless frequency band at a first time, and generate a second carrier signal for wirelessly transmitting over a second wireless frequency band at a second time. The wireless communications circuitry may also transmit and/or receive using various radio access technologies (RATs), such as one or more cellular radio access technologies (e.g., 5G NR, LTE, UMTS, GSM, UMTS, and so on), Wi-Fi, BLUETOOTH®, NFC, and so on. The device 100 may communicate using one or more RATs at different times, or may communicate with one or more RATs contemporaneously. The device 100 may also have times when it does not communicate using any of the RATs. As another example, the charging circuit of the device 100 may intermittently generate an electromagnetic field (EMF) carrier signal for wirelessly communicating with a remote charging circuit. In some embodiments, the charging circuit may communicate with the remote charging circuit using Qi communications. The power delivery system and audio output device(s) may also generate various signals—continuously or intermittently. Some, many, or even all of the signals generated by the components may have different frequencies.

Although the signals generated by the components of the device 100 are useful for a variety of purposes, some or all of the signals may present as noise (i.e., noise signals, or aggressor noise) for other components. For example, signals generated by the wireless communications circuitry, charging circuit, power delivery system, and/or audio output device(s) may present as noise signals to the front or rear-facing cameras 110, 124 and interfere with the readout of data from the camera's image sensor. FIGS. 2-13 describe various systems, devices, methods, and apparatus that can be used to mitigate this interference.

Figure 2:
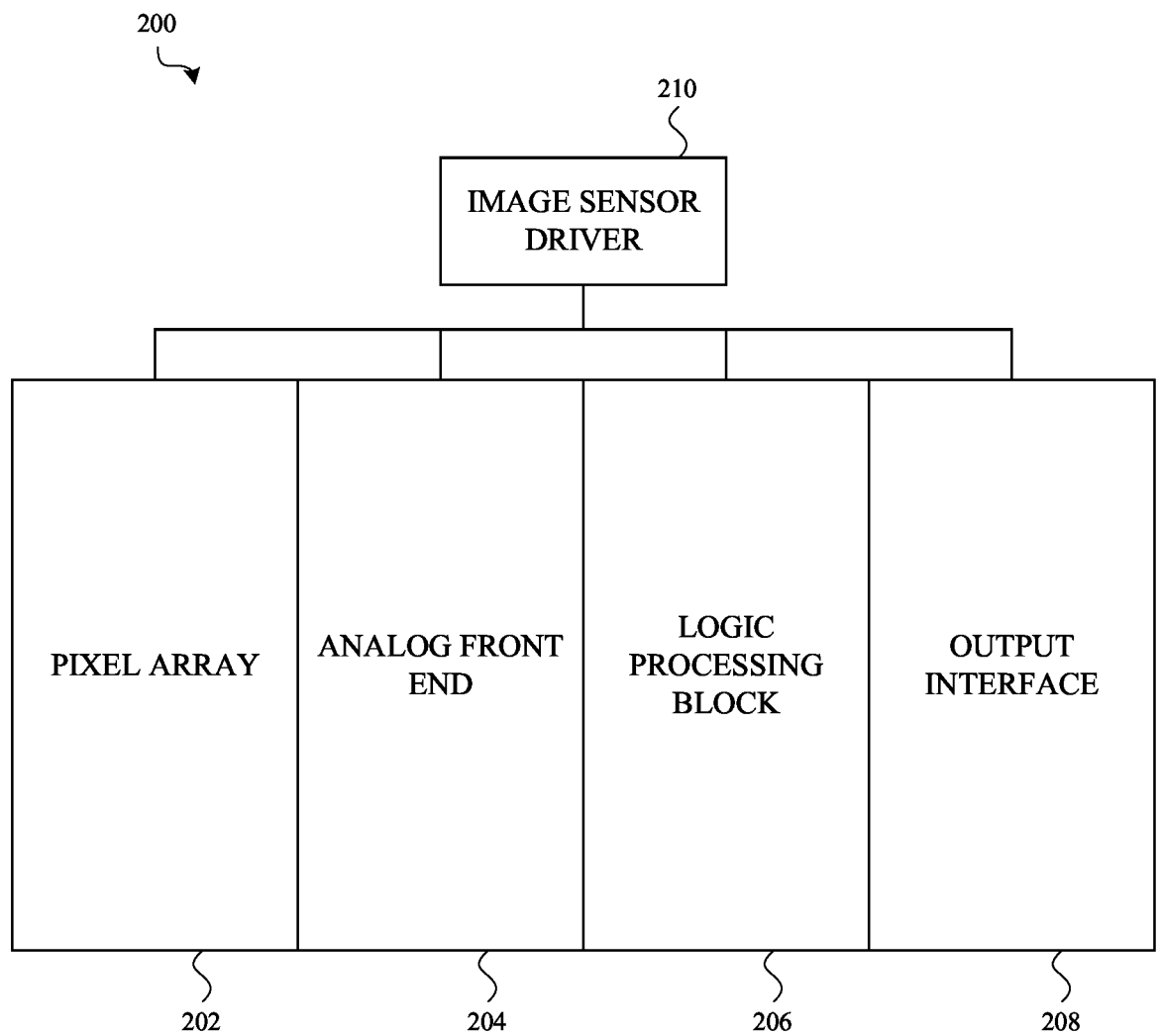
FIG. 2 shows an example block diagram of an image sensor.

FIG. 2 shows an example block diagram of an image sensor 200, which in some cases be an image sensor of the front or rear-facing camera described with reference to FIGS. 1A-1B. As shown, the image sensor 200 may include a pixel array 202 (e.g., an N×N or M×N array of pixels), an analog front end 204, a logic processing block 206, an output interface 208, and an image sensor driver 210. In use, the pixel array 202 may capture an image as an array of photo-generated charges, and the photo-generated charges may be read out of the pixel array 202 and converted to analog voltages (analog pixel values) via the analog front end 204. The logic processing block 206 may include, for example, an array of analog-to-digital converters (ADCs) that convert analog voltages provided by the analog front end 204 to digital values (digital pixel values). Portions of a CDS readout circuit may be incorporated into the analog front end 204 and/or the logic processing block 206. The output interface 208 may include various addressing and switching elements for outputting digital values (pixel values) to a processor or memory. The image sensor driver 210 may control the operation of the pixel array 202, analog front end 204, logic processing block 206, and output interface 208 in response to locally stored instructions and/or instructions received from a processor.

Figure 3:
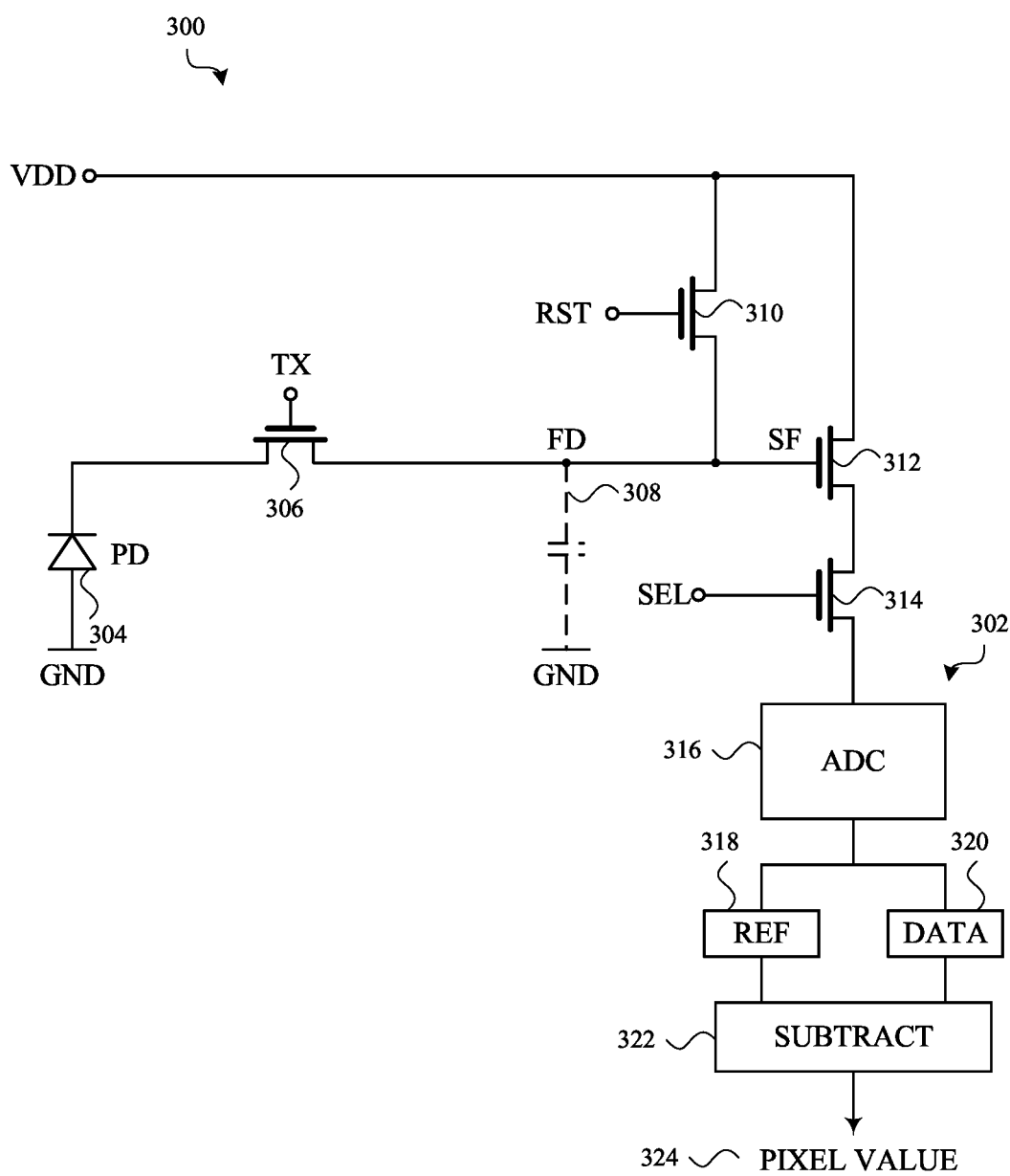
FIG. 3 shows an example schematic of a pixel.

FIG. 3 shows an example schematic of a pixel 300 and CDS readout circuit 302. The pixel 300 and CDS readout circuit 302 may in some cases be used to readout a pixel of the front or rear-facing camera described with reference to FIG. 1, or a pixel of the pixel array 202 described with reference to FIG. 2. The pixel 300 and CDS readout circuit 302 may also be used to readout a pixel of another type of camera or image sensor. Although FIG. 3 shows one example pixel and CDS readout circuit architecture, the pixel 300 and CDS readout circuit 302 could alternatively be implemented in other ways.

By way of example, the pixel 300 may include a photodetector 304, a charge transfer (Tx) gate 306, a sense region 308, a reset (RST) switch 310, a readout transistor 312, and a row-select (SEL) transistor 314. The term "photodetector" is used herein to refer to substantially any type of photon or light detecting component, such as a photodiode (e.g., an electron-based photodiode (PD) or hole-based PD), a pinned photodiode, a photogate, or another type of photon sensitive region. The term "sense region," as used herein, is meant to encompass substantially any type of charge storing or charge converting region, and in some cases may include a floating diffusion (FD) node. Each of the charge transfer gate 306, reset switch 310, readout transistor 312, and row select transistor 314 may be provided by a respective transistor that is turned ON or OFF by asserting or de-asserting a signal (e.g., a TX signal, a RST signal, a SF signal, or a SEL signal) applied to a gate of the transistor. When a transistor is turned ON, current flows between its source and drain terminals. When a transistor is turned OFF, no or negligible current flows between its source and drain terminals. The readout transistor 312 may be or include, for example, a source follower (SF) transistor. In some cases, the row select transistor 314 may be omitted and a pulsed power supply may be used to select the pixel 300.

The terminals of the photodetector 304 may be respectively coupled to ground (GND) and the source of the charge transfer gate 306. The drain of the charge transfer gate 306 may be connected to the sense region 308. The source and drain of the reset switch 310 may be respectively coupled to a voltage supply (VDD) and the sense region 308. The gate of the readout transistor 312 may be connected to the sense region 308, and the drain and source of the readout transistor 312 may be respectively coupled to the voltage supply (VDD) and the drain of the row select transistor 314. The source of the row select transistor 314 may be connected to an input of the CDS readout circuit 302.

During a shutter/exposure operation of the pixel 300, the charge transfer gate 306 and reset switch 310 may both be turned ON, while the row select transistor 314 is turned OFF, to flush residual charge from the photodetector 304. Subsequently, the charge transfer gate 306 and reset switch 310 may be turned OFF to start an integration period in which the photodetector 304 integrates photo-generated charge.

To read out the photo-generated charge, the reset switch 310 may be turned ON to flush residual charge from the sense region 308, and the row select transistor 314 may also be turned ON. A charge may then be read out of the sense region 308 and converted to a voltage by means of the readout transistor 312 and row select transistor 314. The voltage may be converted to a digital reference (REF) value by an analog-to-digital converter (ADC) 316 and temporarily stored in a REF register 318. The reference value represents a charge that is accumulated by the sense region 308 as a result of baseline noise, kt/C noise, signal path offset, and other noise, and does not reflect the photo-generated charge integrated by the photodetector 304.

After reading the reference value from the sense region 308, the reset switch 310 may be turned OFF and the charge transfer gate 306 may be turned ON. This transfers the photo-generated charge acquired by the photodetector 304 to the sense region 308, for temporary storage and subsequent readout. The photo-generated charge may be read out of the sense region 308 and converted to a voltage by means of the readout transistor 312 and row select transistor 314. The voltage may be converted to a digital signal value (a signal plus noise value) by the ADC 316 and temporarily stored in a DATA register 320. Thereafter, the charge transfer gate 306 and row select transistor 314 may be turned OFF. Although the signal value stored in the DATA register 320 generally represents the photo-generated charge that is integrated by the photodetector 304, the signal value also includes the baseline noise, kt/C noise, signal path offset, and other noise of the sense region 308.

To generate a digital value that is representative of the photo-generated charge without noise, the REF value stored in the REF register 318 may be subtracted from the signal value store in the DATA register 320 (e.g., by a subtraction circuit or processor 322) to yield a pixel value 324. The process of acquiring the REF value stored in the REF register 318 and the signal value stored in the DATA register 320, and then subtracting the REF value from the signal value to yield the pixel value 324, is referred to as a CDS operation.

In an alternative configuration of the pixel 300 and CDS readout circuit 302, the reference value may be temporarily stored in the analog domain, and subtracted from the signal plus noise value in the analog domain, to produce a singular analog value which is converted into a digital pixel value by the ADC 316. In such an embodiment, the REF and DATA registers 318, 320 would be replaced by respective capacitive or other analog storage components positioned upstream from the ADC 316, and the subtraction circuit 322 would be replaced by an analog subtraction circuit (or subtraction node) positioned upstream from the ADC 316 and downstream from the analog storage components.

Figure 4:
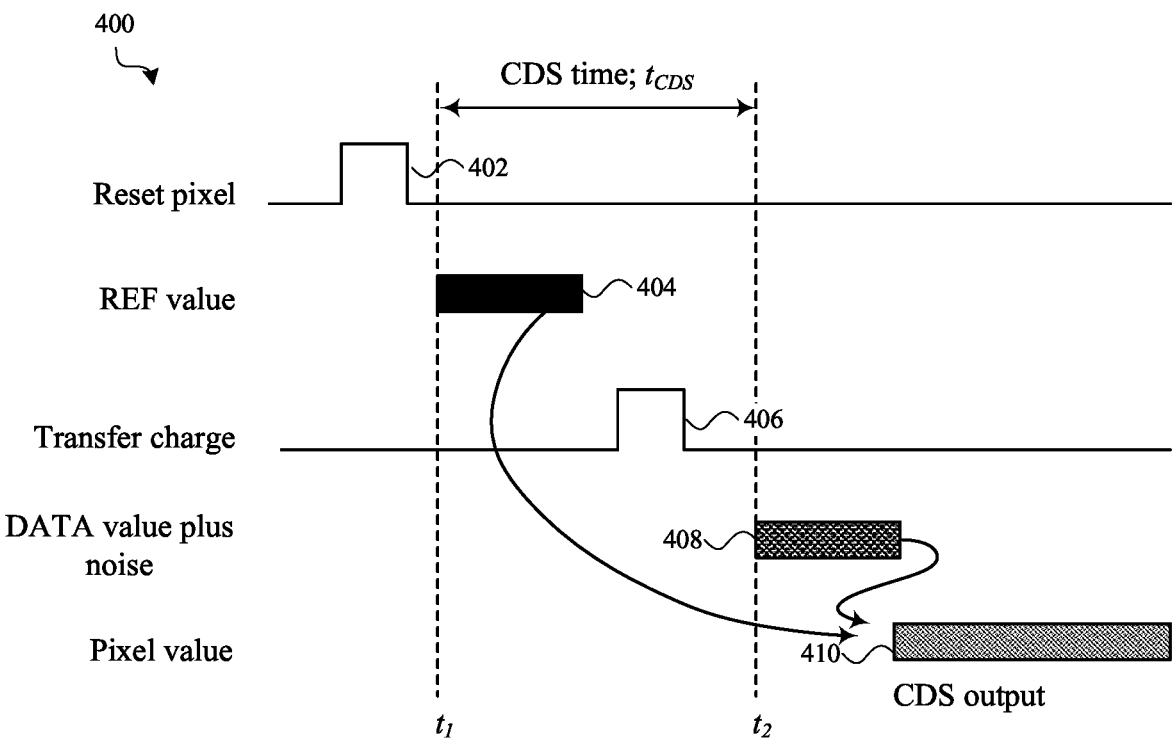
FIG. 4 shows an example timing diagram for a CDS readout operation.

FIG. 4 shows an example timing diagram 400 for a CDS readout operation. In some cases, the CDS readout operation may be the CDS readout operation described with reference to FIG. 3.

The first line of the timing diagram 400 shows a pulse 402 representing the commencement of readout. With reference to FIG. 3, the pulse 402 may represent the turning ON of the reset switch and row select transistor.

The second line of the timing diagram 400 shows the readout and conversion of a reference value 404.

The third line of the timing diagram 400 shows a pulse 406 representing the commencement of signal readout. With reference to FIG. 3, the pulse 406 may represent the turning OFF of the reset switch and turning ON of the charge transfer gate.

The fourth line of the timing diagram 400 shows the readout and conversion of a signal value (signal plus noise value) 408.

The fifth line of the timing diagram 400 shows a subtraction of the reference value 404 from the signal value 408, to yield a value representative of the charge integrated by a photodetector (e.g., a pixel value 410).

As shown, the readout of the reference value 404 may begin at a time $t_1$, and the readout of the signal value 408 may begin at a time $t_2$. The time represented by $t_2-t_1$ is referred to as the CDS time ($t_{CDS}$). The CDS frequency is the inverse of the CDS time (i.e., $1/t_{CDS}$).

Since a CDS operation is a sequence of events in the time domain, a CDS operation provides noise filtering of various degrees to tones at different frequencies. An example representation of CDS filtering 500 in the frequency domain is shown in FIG. 5.

Figure 5:
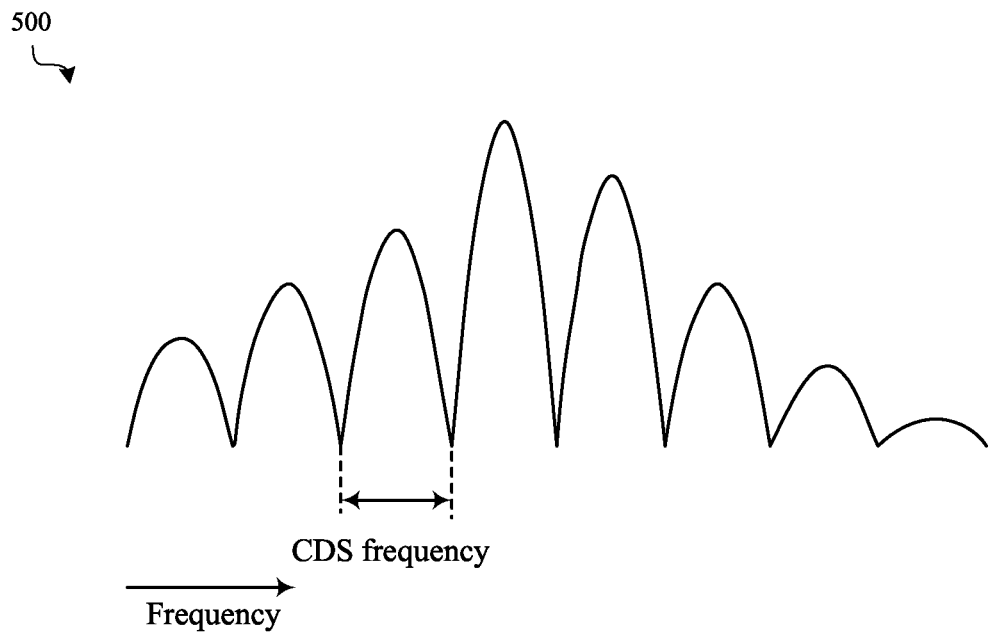
FIG. 5 shows an example representation of CDS filtering in the frequency domain.

The CDS filtering 500 shown in FIG. 5 suggests that, at certain frequencies, a CDS operation ensures perfect noise cancelation. The nulls of the CDS filtering 500 are equidistant, and spaced apart in the frequency domain by the CDS frequency. This implies that a CDS operation in which the reference value and signal value are sampled at the same amplitude and phase provides perfect noise filtering. And thus, if the times $t_1$ and $t_2$ can be aligned with the amplitude and phase of a noise signal, the noise signal can be completely canceled from the signal output of a CDS readout circuit.

Figure 6A:
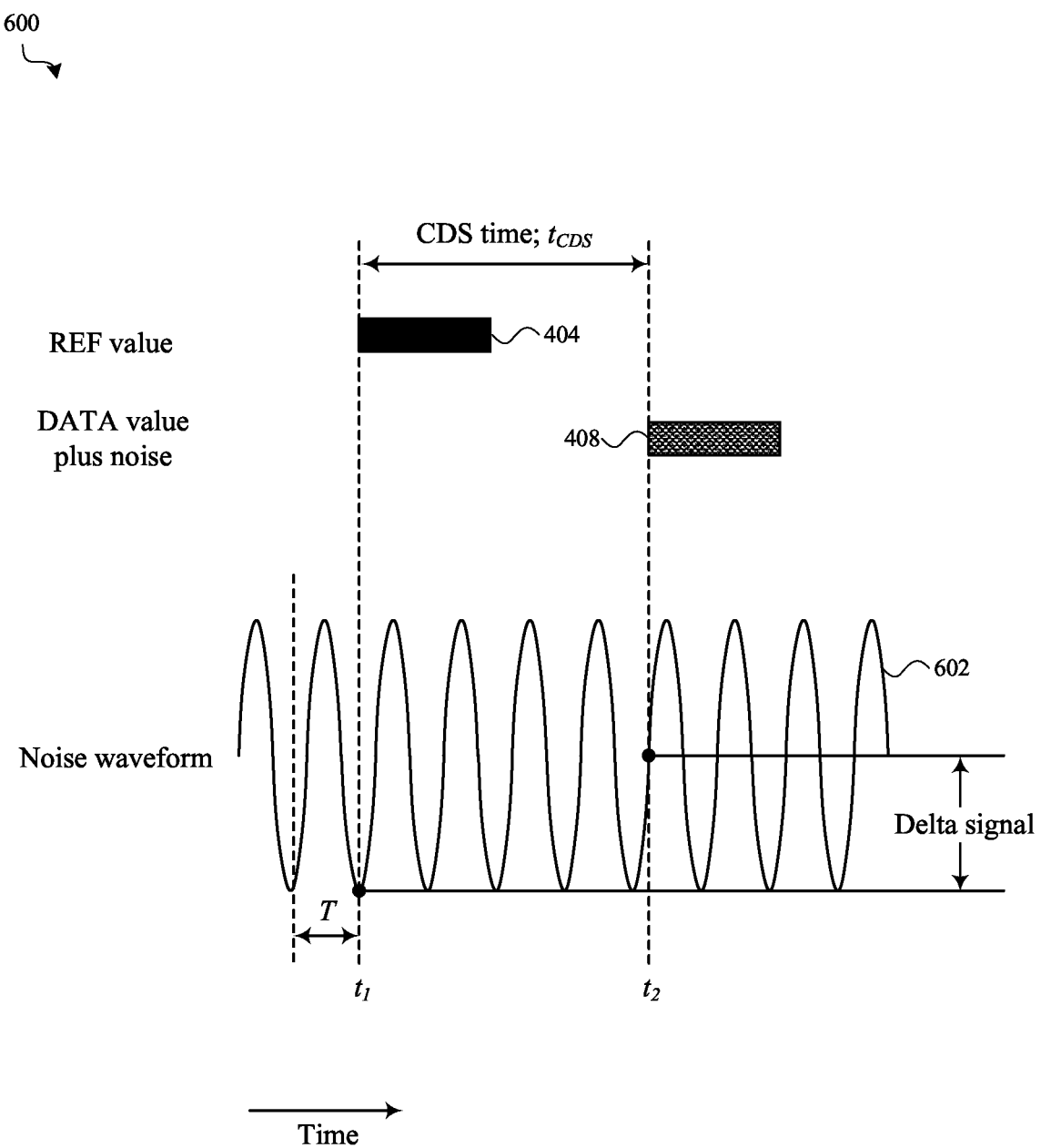
FIG. 6A shows a portion of the timing diagram described with reference to FIG. 4, in combination with a first noise waveform.

FIG. 6A shows a portion 600 of the timing diagram described with reference to FIG. 4, in combination with a noise waveform 602. By way of example, the noise (or aggressor) waveform 602 is shown to be sinusoidal. In other embodiments, the noise waveform 602 may take any kind of periodic form. As shown in FIG. 6A, the noise waveform 602 has a period, T, and the CDS time, $t_{CDS}$, is not a multiple of the period, T. Stated differently, $t_{CDS} \neq N*T$, where N is an integer greater than or equal to 1. As a result, when a reference value is read at time $t_1$ and a signal value is read at time $t_2$, the reference value and signal value include different amounts of aggressor noise and the aggressor noise is not completely canceled by a CDS operation. In some cases, the uncanceled aggressor noise may show up as horizontal noise in the image data output by an image sensor.

Figure 6B:
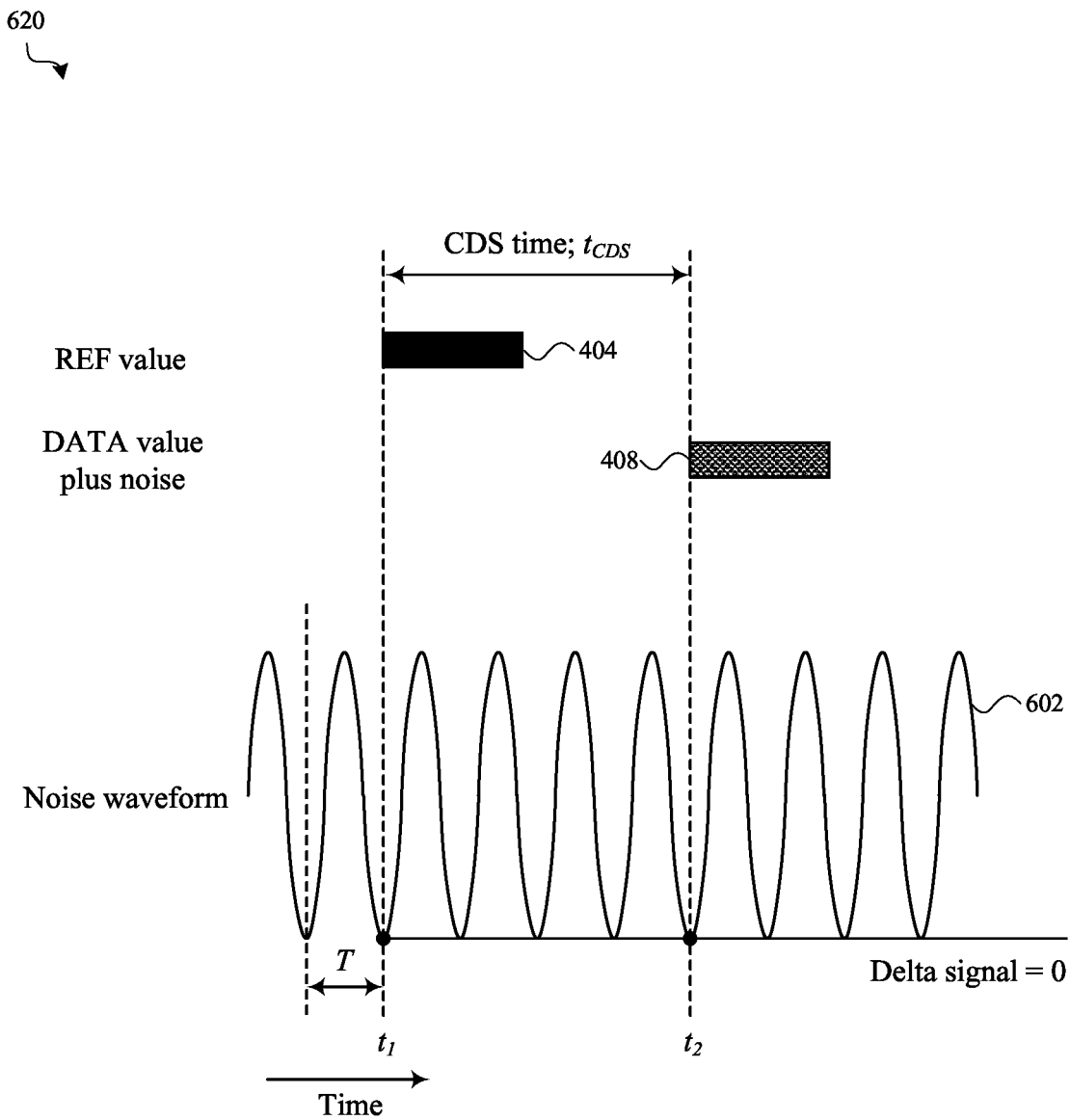
FIG. 6B shows a portion of the timing diagram described with reference to FIG. 4, in combination with a second noise waveform.
Figure 6C:
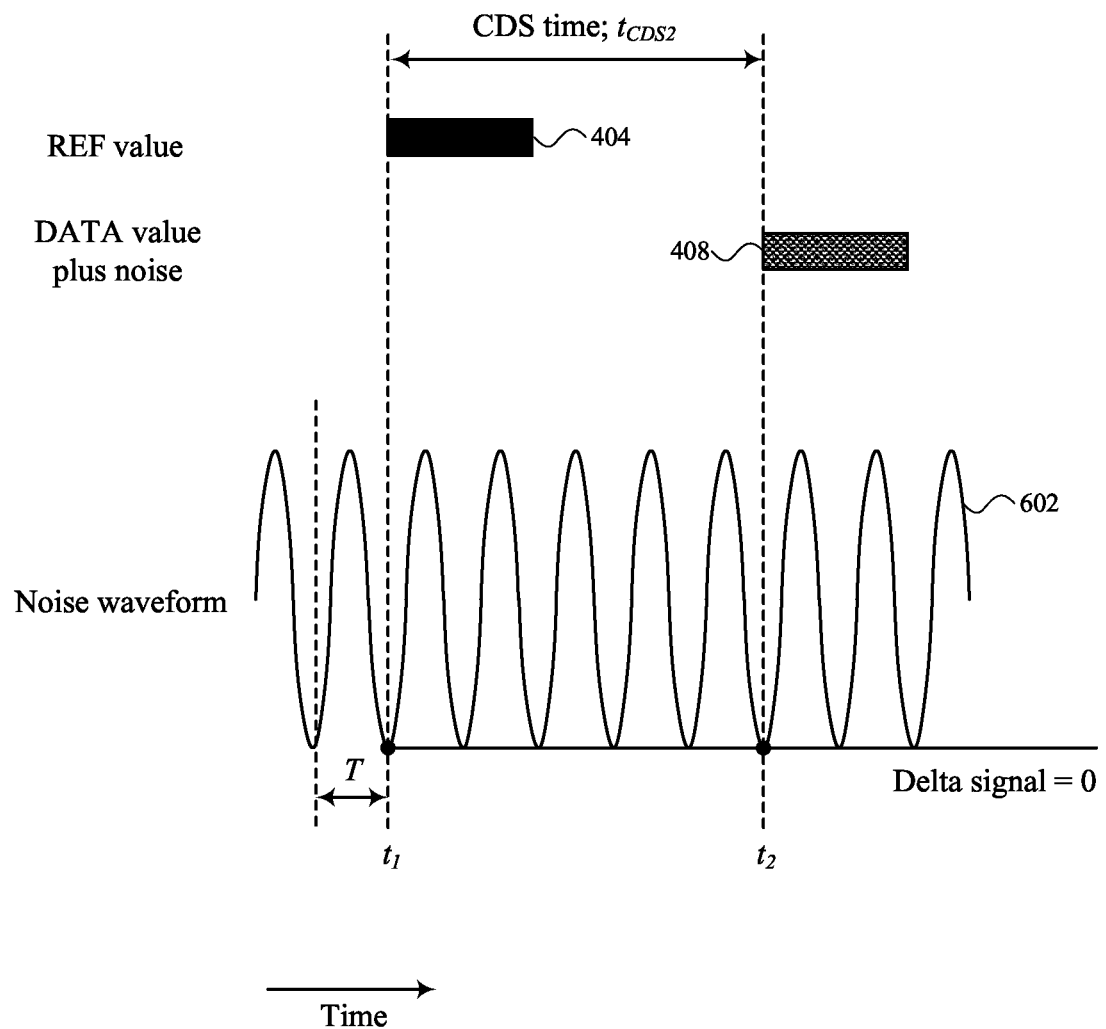
FIG. 6C shows an adjustment of the CDS time shown in FIG. 6A, to sync the frequency of the CDS operation with the frequency of the first noise waveform.

FIG. 6B also shows a portion 620 of the timing diagram described with reference to FIG. 4, but in combination with a different noise waveform 622. By way of example, the noise (or aggressor) waveform 622 is shown to be sinusoidal. In other embodiments, the noise waveform 622 may take any kind of periodic form. As shown in FIG. 6B, the CDS time, $t_{CDS}$, is a multiple of the period, T, of the noise waveform 622. Stated differently, $t_{CDS}=N*T$, where N is an integer greater than or equal to 1. As a result, when a reference value is read at time $t_1$ and a signal value is read at time $t_2$, the reference value and signal value include the same amount of aggressor noise, and the aggressor noise may be completely canceled by a CDS operation.

Often, it may be difficult to adjust the periodicity of aggressor noise generated by components such as wireless communications circuitry, a charging circuit, a power delivery system, and/or an audio output device. As a result, it may be easier to adjust the CDS time of a CDS readout circuit, to make the CDS time a multiple of the aggressor noise period. In some cases, and as described herein, the CDS time may be adjusted by adjusting the timing of the signal readout portion of a CDS readout (e.g., adjusting time $t_2$ in FIG. 4, 6A, or 6B). By adjusting the CDS time of a CDS operation, the CDS timing shown in FIG. 6A may be adjusted, for example, to the CDS timing shown in FIG. 6C, where $t_{CDS2}$ is an adjusted version of $t_{CDS}$, and $t_{CDS2}=N*T$.

Figure 7:
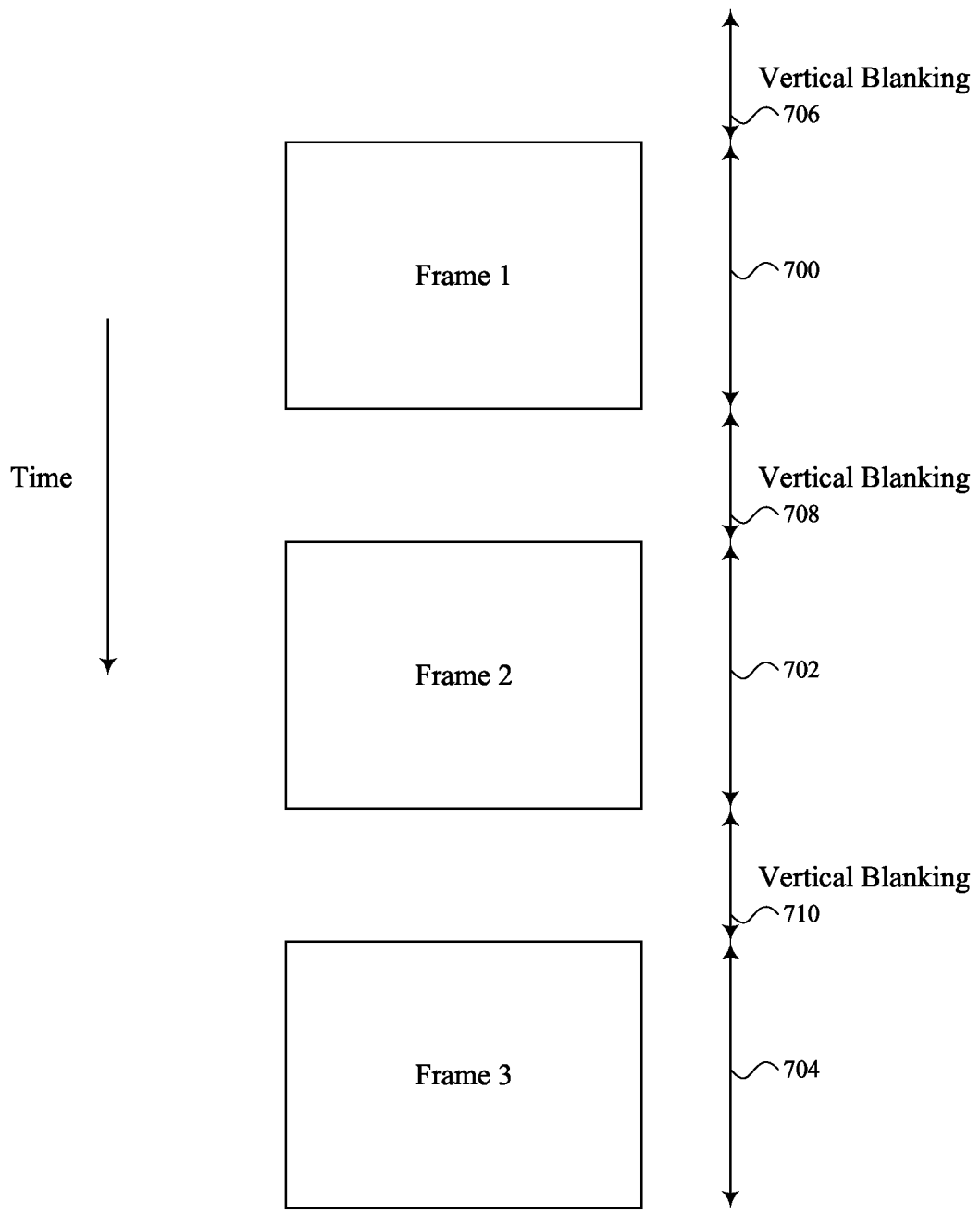
FIG. 7 shows a frame-by-frame and row-by-row readout of a pixel.

As shown in FIG. 7, the pixel values of a pixel array may be read out frame-by-frame and row-by-row. For example, the pixel values may be read out row-by-row for a first image capture frame 700, then the pixel values may be read out row-by-row for a second image capture frame 702, then the pixel values may be read out row-by-row for a third image capture frame 704. Each image capture frame may be preceded/followed by a vertical blanking period (e.g., vertical blanking period 706, 708, or 710). In some cases, the CDS time for reading out the pixel values may be adjusted during a vertical blanking period (i.e., between image capture frames). In some cases, a primary aggressor noise, or an aggregate aggressor noise, or a state of a set of components may be periodically evaluated, and the CDS time for reading out the pixel values may be adjusted (e.g., adjusted during a vertical blanking period) after each evaluation. In some cases, a primary aggressor noise, or an aggregate aggressor noise, or a state of a set of components may be periodically evaluated during or after each image capture frame, and the CDS time may be adjusted (e.g., during a vertical blanking period) before each image capture frame 700, 702, 704.

Figure 8:
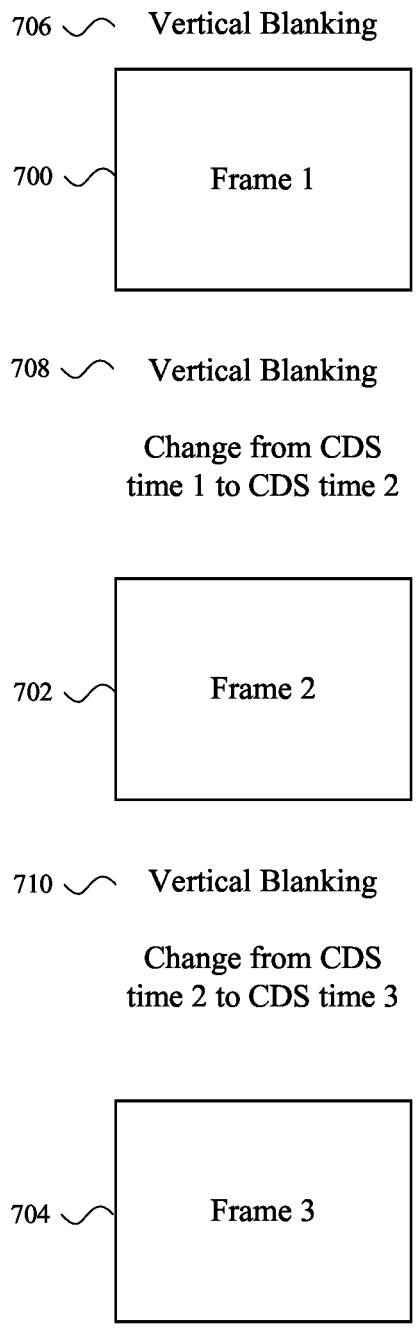
FIG. 8 shows how a CDS time may be changed for a pixel array over time.
Figure 8:
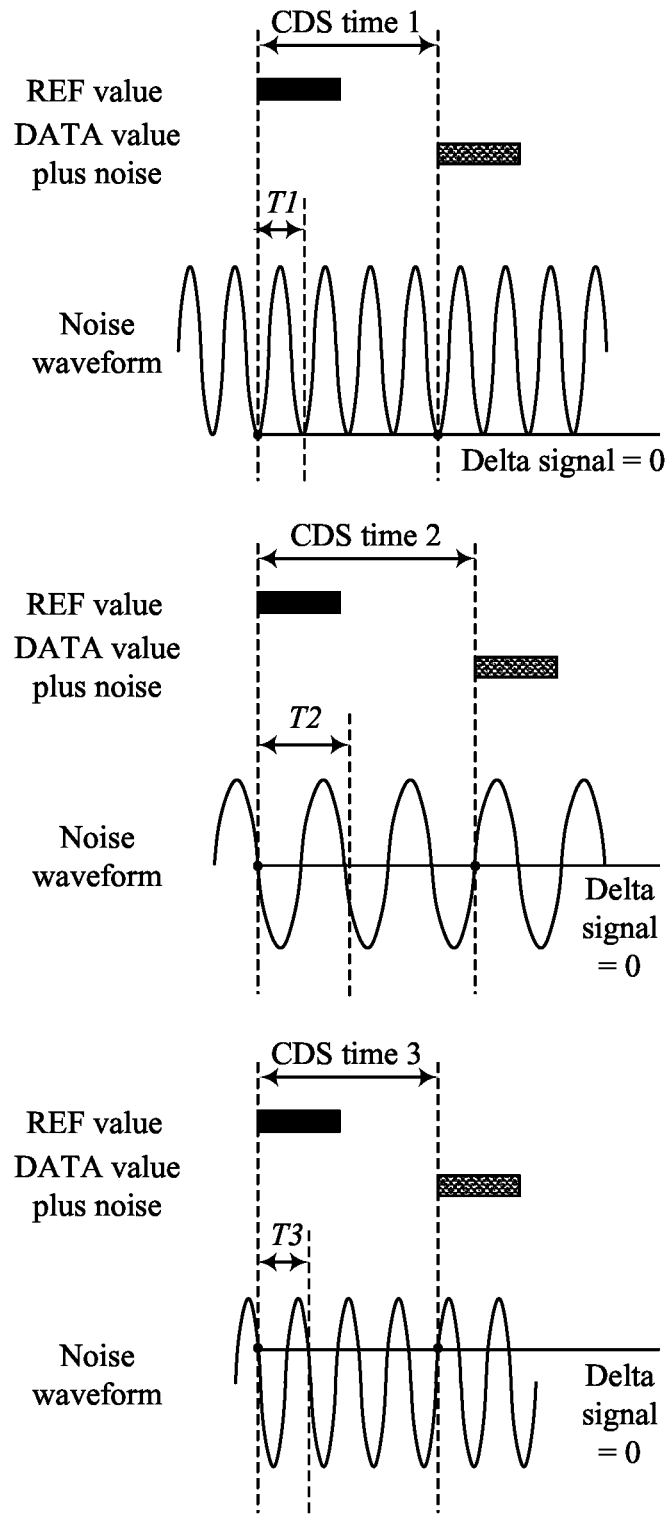

FIG. 8 shows how a CDS time may be changed for a pixel array over time, as a primary aggressor noise, or an aggregate aggressor noise, or a state of a set of components changes over time. By way of example, FIG. 8 shows how a CDS time may be changed with respect to the image capture frames and vertical blanking periods described with reference to FIG. 7.

During a first vertical blanking period 706, prior to the first image capture frame 700, the CDS time may be adjusted to be a multiple of a period, T1, of a first aggressor mode. The first aggressor mode may depend, for example, on whether one or more wireless communication modes are being used—individually or in combination; on whether a wireless charging circuit is being used; on the state of a power delivery system; on the state of one or more audio output devices; and so on. The CDS time may be determined for the first image capture frame 700 during, or before, the first vertical blanking period 706.

During a second vertical blanking period 708, after the first image capture frame 700 and prior to the second image capture frame 702, the CDS time may be adjusted to be a multiple of a period, T2, of a second aggressor mode. The second aggressor mode may also depend, for example, on whether one or more wireless communication modes are being used—individually or in combination; on whether a wireless charging circuit is being used; on the state of a power delivery system; on the state of one or more audio output devices; and so on. However, the second aggressor mode may differ from the first aggressor mode. The CDS time may be determined for the second image capture frame 702 during, or before, the second vertical blanking period 708.

During a third vertical blanking period 710, after the second image capture frame 702 and prior to the third image capture frame 704, the CDS time may be adjusted to be a multiple of a period, T3, of a third aggressor mode. The third aggressor mode may also depend, for example, on whether one or more wireless communication modes are being used—individually or in combination; on whether a wireless charging circuit is being used; on the state of a power delivery system; on the state of one or more audio output devices; and so on. However, the third aggressor mode may differ from the first and second aggressor modes. The CDS time may be determined for the third image capture frame 704 during, or before, the third vertical blanking period 710.

Although the aggressor mode may change asynchronously with a series of image capture frames, and may change prior to, during, or after any particular image capture frame, the CDS time adjustments described with reference to FIG. 8 enable a CDS time adjustment to be made, at least, prior to a next image capture frame following the change in aggressor mode. In other embodiments, CDS time adjustments may be made less frequently.

Figure 9:
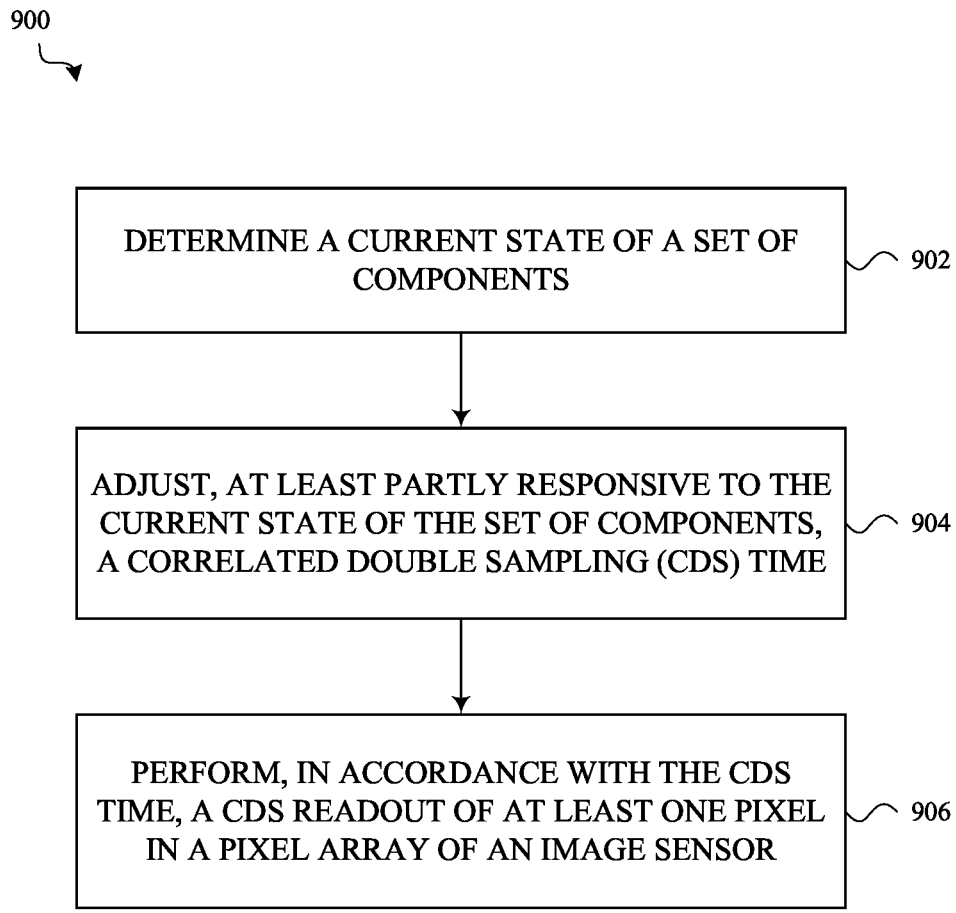
FIG. 9 shows an example method of reading a pixel value from an image sensor (or pixel array) housed with a set of components.

FIG. 9 shows an example method 900 of reading a pixel value from an image sensor (or pixel array) housed with a set of components. The set of components may include one or more of wireless communications circuitry, a charging circuit, a power delivery system, an audio output device, and/or other components.

At block 902, the method 900 may include determining a current state of the set of components.

At block 904, the method 900 may include adjusting, at least partly responsive to the current state of the set of components, a CDS time. The CDS time may be used to configure a CDS readout having a reference readout portion and a signal readout portion. Adjusting the CDS time may include, for example, adjusting a start time of the signal readout portion of the CDS readout. In some embodiments, the CDS time may be adjusted between image capture frames of a pixel array. In some embodiments, the CDS time may be adjusted before each image capture frame of the pixel array.

At block 906, the method 900 may include performing, in accordance with the adjusted CDS time, a CDS readout of at least one pixel in a pixel array of the image sensor. Of note, the adjustment to the CDS time may be provided without a change in the line time of the image sensor, which can remain fixed between an exposure/integration time and a readout time.

Figure 10:
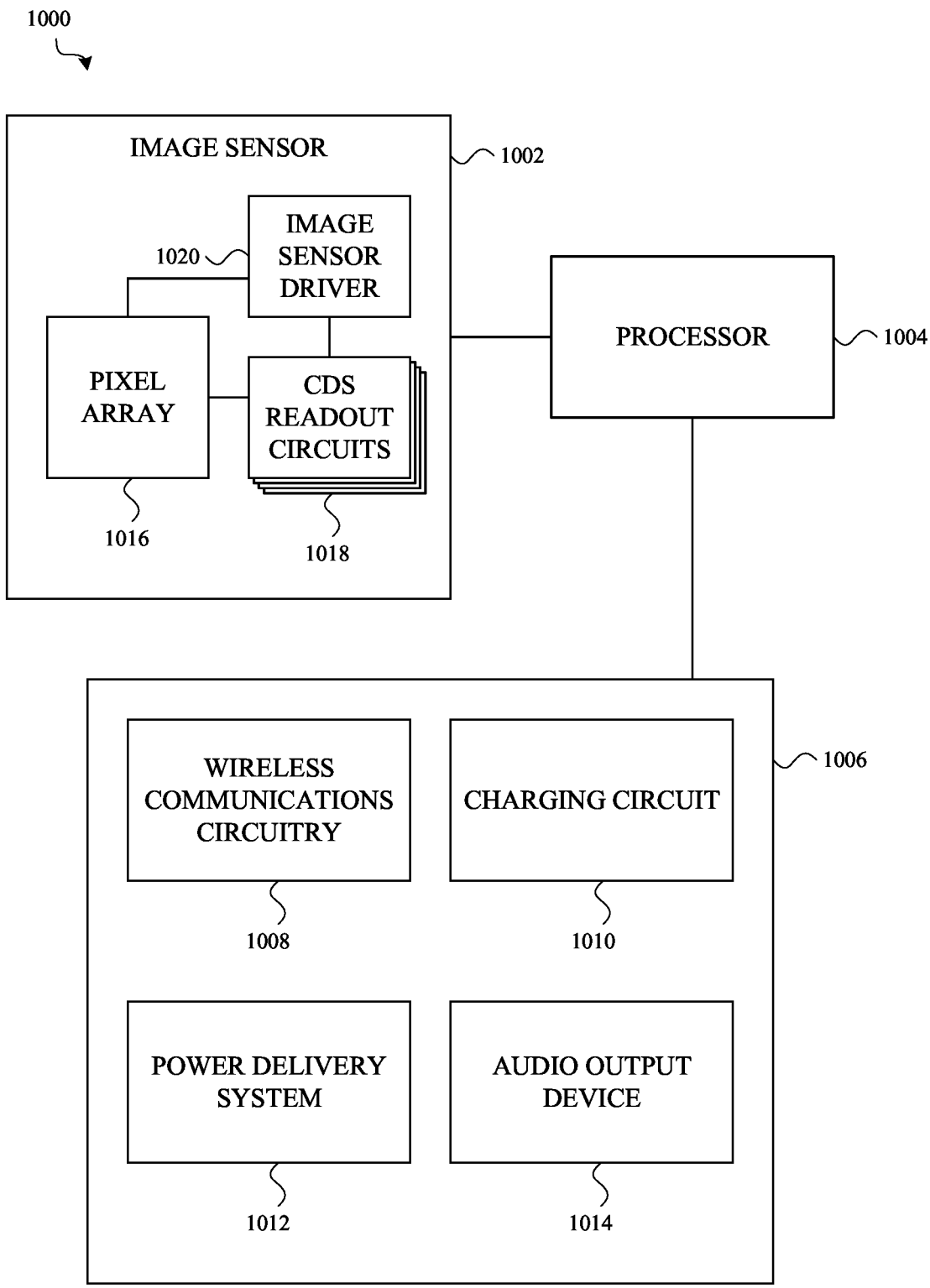
FIG. 10 shows an example block diagram of an electronic device in which the method described with reference to FIG. 9 (or a similar method) may be implemented.

FIG. 10 shows an example block diagram of an electronic device 1000 in which the method described with reference to FIG. 9 (or a similar method) may be implemented. The device 1000 includes various components, including an image sensor (or camera) 1002, a processor 1004, and a set of components 1006 that is operable to selectively or continuously generate an electrical signal or a magnetic signal that presents as noise to the image sensor 1002. In some embodiments, the processor 1004 may be included in the set of components 1006. The set of components 1006 may include, for example, wireless communications circuitry 1008, a charging circuit 1010, a power delivery system 1012, an audio output device 1014, and/or other components.

The image sensor 1002 may include a pixel array 1016, as described for example with reference to others figures herein. The image sensor 1002 may also include an array of CDS readout circuits 1018. In some embodiments, a different CDS readout circuit in the array of CDS readout circuits 1018 may be associated with (e.g., coupled to) each respective pixel in the pixel array 1016. The image sensor 1002 may further include an image sensor driver 1020, which image sensor driver 1020 may be coupled to the pixel array 1016 and the CDS readout circuits 1018. The image sensor driver 1020 may be formed on a same substrate as the image sensor 1002 and/or array of CDS readout circuits 1018, or be integrated into a same system on chip (SoC) device as the pixel array 1016 and/or array of CDS readout circuits 1018, or otherwise be associated with the pixel array 1016 and/or array of CDS readout circuits 1018 to form the image sensor 1002.

The processor 1004 may determine a current state of the set of components 1006. In some cases this may be done by accessing a system state table, or memory, and determining which of the components 1006 are active and in what mode (e.g., when a component is capable of being operated in different modes). In one simple case, the set of components 1006 may include just one component (e.g., just the charging circuit), and the state of the set of components may be an indication of whether the single component is ON or OFF (or active or inactive). In more complex cases, the processor 1004 may not only determine which of one or more components are ON or OFF, but also determine the mode in which one or more components are operating. For example, the wireless communications circuitry 1008 may be operable in a plurality of wireless communication modes.

The processor 1004 may provide an indication of the current state of the set of components to the image sensor driver 1020. After receiving the indication, and at least partly responsive to the indication, the image sensor driver 1020 may adjust a CDS time of the CDS readout circuits in the array of CDS readout circuits 1018. In some embodiments, the adjustment of the CDS time may also be responsive to a timing of image capture frames and vertical blanking periods (or similar timing gaps between the readout of image capture frames). For example, in some embodiments, the CDS time may only be adjusted during a vertical blanking period.

In some cases, the indication of the current state of the set of components may be a binary value or signal state, and the image sensor driver 1020 may toggle between one of two CDS times in response to the indication. In other cases, the indication of the current state of the set of components may assume one of three or more values or signal states, and the image sensor driver 1020 may retrieve a corresponding CDS time from a lookup table or other memory structure. In other cases, the indication of the current state of the set of components may include a frequency, active component list, or other one or more items of information, and the image sensor driver 1020 may lookup or otherwise determine the CDS time using a more complex process.

In a first example, the set of components 1006 may include wireless communications circuitry 1008 operable in different wireless communication modes (and possibly other components). In this example, the state of the set of components may be at least partly dependent on a current wireless communication mode (or modes) of the wireless communications circuitry 1008. The wireless communication mode(s) may include, for example, a first wireless communication mode using a first wireless frequency range, and a second wireless communication mode using a second wireless frequency range. The second wireless frequency range may be different from the first wireless frequency range. The wireless communication mode(s) may also or alternatively include a cellular radio wireless communication mode, and a local area network wireless communication mode. In some cases, the wireless communication mode(s) may include one or more of a 5G NR, LTE, UMTS, GSM, UMTS, Wi-Fi, Bluetooth, or NFC wireless communication mode.

In a second example, the set of components 1006 may include the charging circuit 1010 (and possibly other components), and the state of the set of components may be at least partly dependent on a state of the charging circuit 1010 (e.g., active or inactive).

In a third example, the set of components 1006 may include the power delivery system 1012 (and possibly other components). The power delivery system 1012 may be configured to provide power to the image sensor 1002, as well as to other components (e.g., the processor 1004, the wireless communications circuitry 1008, the audio output device 1014, and so on). In this example, the state of the set of components may be at least partly dependent on a state of the power delivery system (e.g., the amount of power being delivered and/or the identities or locations of the components being powered).

In a fourth example, the set of components 1006 may include the audio output device 1014 (and possibly other components), and the state of the set of components may be at least partly dependent on a state of the audio output device (e.g., ON or OFF, or active or inactive).

Figure 11A:
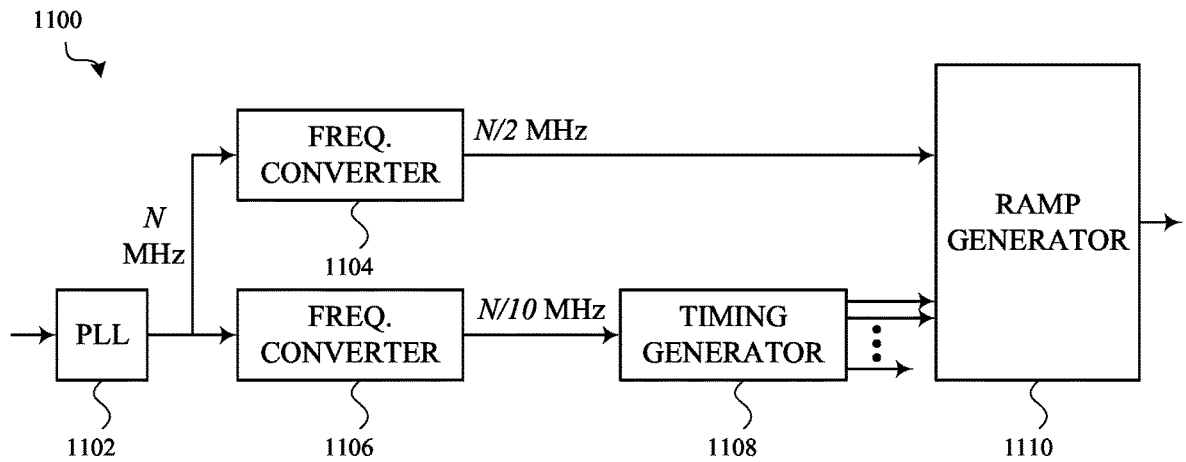
FIG. 11A shows an example block diagram of a circuit that may be used to generate timing signals for an ADC of a CDC readout circuit.

FIG. 11A shows an example block diagram of a circuit 1100 that may be used to generate timing signals for an ADC of a CDC readout circuit. The circuit 1100 may include a phase locked loop (PLL) 1102 that generates a high-frequency clock signal. By way of example, the frequency of the high-frequency clock signal is indicated to be N MHz. The high-frequency clock signal may be provided to an ADC as is, or may be down-converted to a mid-frequency clock signal (e.g., a clock signal having a frequency of N/2 MHz) by a first frequency converter 1104. In the case of a ramp-based ADC, the high-frequency clock signal or mid-frequency clock signal may be provided to a ramp generator 1110 of a ramp-based ADC, and may be used to clock the steps of an analog voltage ramp produced by the ramp generator 1110. Depending on the direction of the ramp (e.g., ascending or descending), the ADC may output a digital value (a DATA value) corresponding to a first clocked step corresponding to a ramp voltage that exceeds or falls below an analog voltage read out of a pixel. The ramp generator 1110 may be used to produce both a reference ramp and a data ramp.

The high-frequency clock signal may also be down-converted to a low-frequency clock signal (e.g., a clock signal having a frequency of N/10 MHz) by a second frequency converter 1106. The low-frequency clock signal may be provided to a timing generator 1108 that produces various timing signals for the ramp generator 1110 (or for the ADC in general). The timing signals may be used, for example, to clock various logic elements of the ramp generator 1110, and to start and stop a voltage ramp (e.g., both a first voltage ramp (a REF ramp) for converting an analog reference value of a CDS operation to a digital value (i.e., to a digital REF value), and a second voltage ramp (a DATA ramp) for converting an analog signal value of a CDS operation to a digital value (i.e., to a DATA value)). The low-frequency clock helps reduce the overall power consumption of the circuit 1100, and may be used to generate low-frequency timing signals.

Figure 11B:
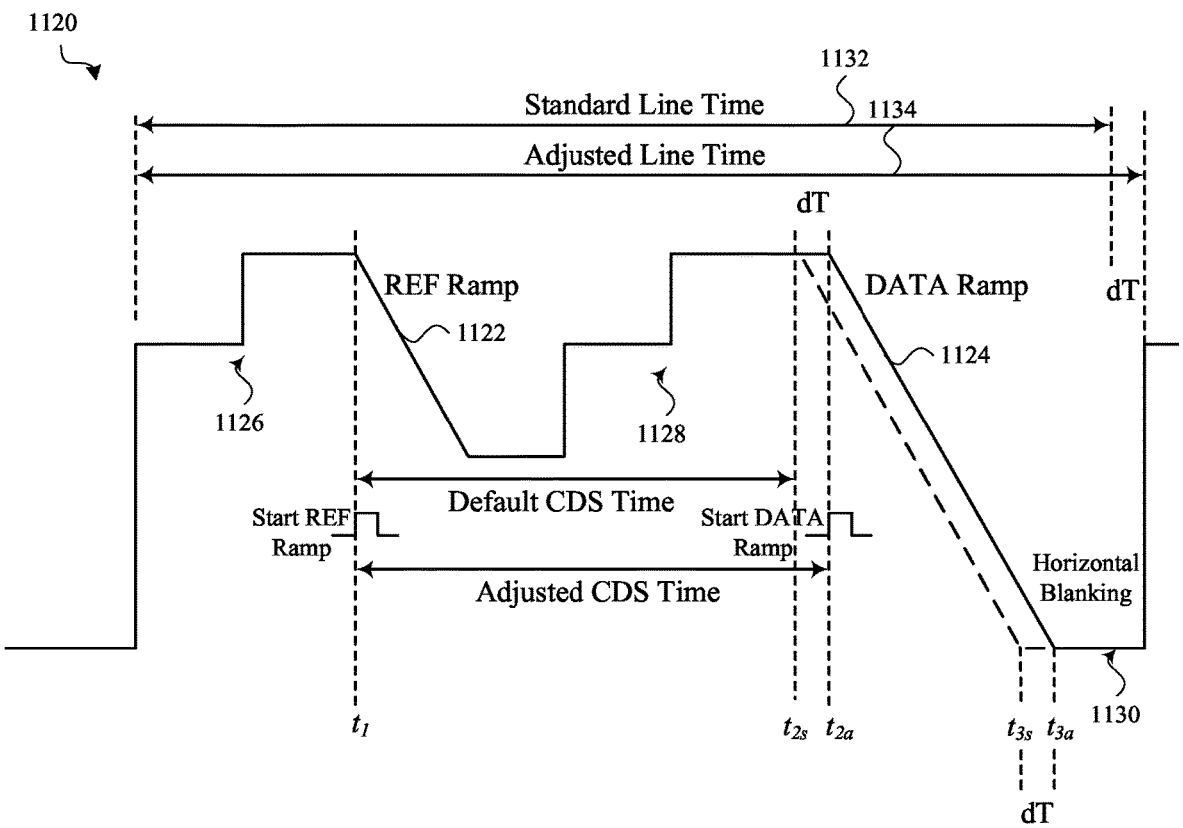
FIG. 11B shows a low-resolution example of a waveform that may be produced by the ramp generator described with reference to FIG. 11A.
Figure 11C:
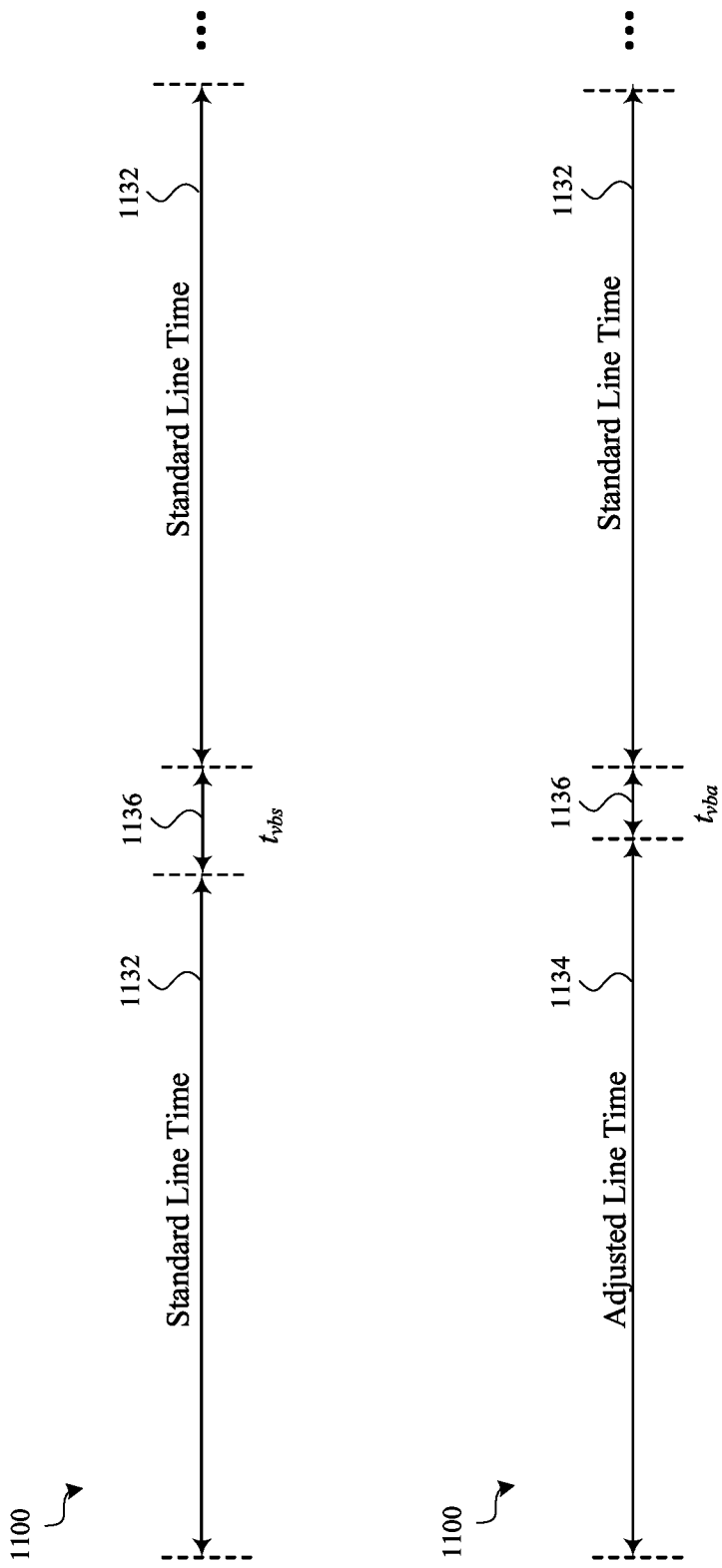
FIG. 11C shows an example change in vertical blanking period caused by adjusting a CDS time.

FIG. 11B shows a low-resolution example of a waveform 1120 that may be produced by the ramp generator described with reference to FIG. 11A. The waveform 1120 includes a reference (REF) ramp 1122 starting at a time $t_1$, a data ramp 1124 starting at a time $t_{2s}$, a first switching time 1126 prior to the reference ramp 1122, a second switching time 1128 between the reference ramp 1122 and the data ramp 1124, and a horizontal blanking period 1130 following the data ramp 1124. The time $t_1$ may be triggered by a reference ramp start signal received from the timing generator 1108, and the time $t_{2s}$ may be triggered by a data ramp start signal received from the timing generator 1108. The period of time between $t_1$ and $t_{2s}$ is the CDS time.

Figure 12:
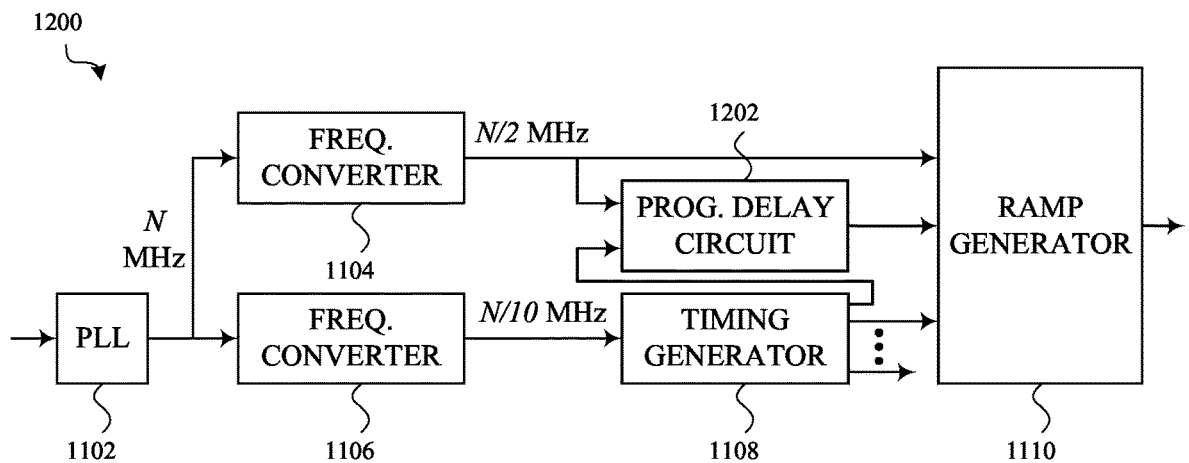
FIG. 12 shows a modification to the circuit described with reference to FIG. 11.

The timing generator 1108 may enable adjustment of the time $t_{2s}$ to time $t_{2a}$, (an adjustment of dT), and a consequent adjust of the CDS time, in response to an indication received from a processor, which indication is representative of the current state of a set of components that might introduce noise into a CDS operation. The timing generator 1108 may also enable adjustment of the time $t_{2s}$ to time $t_{2a}$, and consequent adjust of the CDS time, in accord with a particular resolution, as determined by the frequency of the low-frequency clock output by the second frequency converter 1106. In some cases, the coarseness of this resolution requires significant movement of the data ramp start time, from time $t_{2s}$ to $t_{2a}$, to sync the CDS frequency to a multiple of a noise waveform's frequency. However, significant movement of the data ramp start time, to $t_{2a}$, requires significant movement of the data ramp stop time, from $t_3$, to $t_{3a}$. Movement of the data ramp stop time, to $t_{3a}$, increases the line time (i.e., the time it takes to read out a line of pixel values in an image sensor), from a standard line time 1132 to an adjusted line time 1134. If the horizontal blanking period 1130 is maintained, the increased line time shortens the duration of a subsequent vertical blanking period 1136 (i.e., the delay between reading out different lines (or rows) of pixel values in an image sensor), from a time $t_{vbs}$ to a time $t_{vba}$ (see, FIG. 11C). Shortening the vertical blanking period may be undesirable because it increases the power consumption of the image sensor (e.g., because some components of the image sensor can be powered down or transitioned to a low power state during the vertical blanking period 1136, and a longer line time 1134 and shorter vertical blanking period 1136 means the components need to be powered for a longer time). As an alternative to significant movement of the data ramp start and stop times, the degree to which the CDS frequency and noise waveform frequency are synced may be relaxed, meaning that less of the noise attributable to the noise waveform may be canceled from the "signal plus noise" read out from a pixel. FIG. 12 shows a modification to the circuit described with reference to FIG. 11A. In the circuit 1200, a programmable delay circuit 1202 is added to the circuit 1100. The programmable delay circuit 1202 is configured to selectively add a delay to a timing signal (e.g., a data ramp start signal) generated by the timing generator 1108, and may include, for example, an m-bit, n-tap, double clock edge programmable delay circuit. In some cases, the m-bit, n-tap, double clock edge programmable delay circuit (or the programmable delay circuit 1202 in general) may receive the high-frequency clock output by the PLL 1102, or the mid-frequency clock output by the first frequency converter 1104, as a clock input. The m-bit, n-tap, double clock edge programmable delay circuit (or the programmable delay circuit 1202 in general) may also receive an output of the timing generator 1108 as a data input. In response to these inputs, the programmable delay circuit 1202 may adjust the start and stop times of the data ramp 1124 with a finer resolution (e.g., finer than the granularity of the low-frequency clock signal provided to the timing generator 1108 and/or finer than the granularity of signals provided directly to the ramp generator 1110 by the timing generator 1108), enabling the CDS frequency to be synced with a noise waveform's frequency with less movement of the start and stop times of the data ramp 1124 (or approximately synced, but with greater noise cancelation).

The delay provided by the programmable delay circuit 1202 may be programmed, for example, by an image sensor driver, such as the image sensor driver described with reference to FIG. 2. The image sensor driver may program the programmable delay circuit 1202, and thereby selectively add a delay to a timing signal generated by the timing generator 1108 (e.g., the data ramp start signal), by programming the programmable delay circuit 1202 directly, or by programming the timing generator 1108 and thereby indirectly programming the programmable delay circuit 1202.

Figure 13:
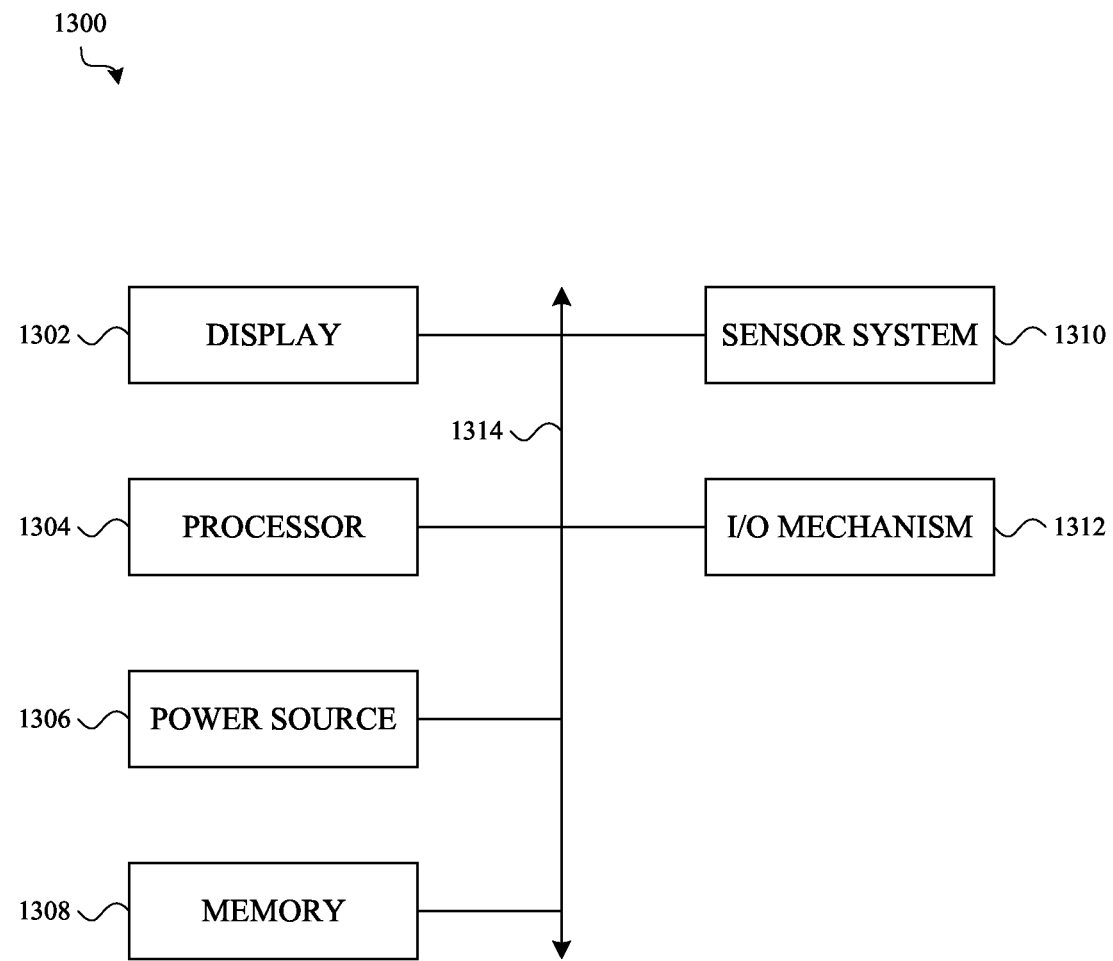
FIG. 13 shows a sample electrical block diagram of an electronic device that includes an image sensor.

FIG. 13 shows a sample electrical block diagram of an electronic device 1300 that includes an image sensor, such as the image sensor described with reference to FIGS. 1A-1B or 2. The electronic device 1300 may take forms such as a hand-held or portable device (e.g., a smartphone, tablet computer, or electronic watch), a navigation system of a vehicle, and so on. The electronic device 1300 may include an optional display 1302 (e.g., a light-emitting display), a processor 1304, a power source 1306, a memory 1308 or storage device, a sensor system 1310, and an optional input/output (I/O) mechanism 1312 (e.g., an input/output device and/or input/output port). The processor 1304 may control some or all of the operations of the electronic device 1300. The processor 1304 may communicate, either directly or indirectly, with substantially all of the components of the electronic device 1300. For example, a system bus or other communication mechanism 1314 may provide communication between the processor 1304, the power source 1306, the memory 1308, the sensor system 1310, and/or the input/output mechanism 1312.

The processor 1304 may be implemented as any electronic device capable of processing, receiving, or transmitting data or instructions. For example, the processor 1304 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments, the components of the electronic device 1300 may be controlled by multiple processors. For example, select components of the electronic device 1300 may be controlled by a first processor and other components of the electronic device 1300 may be controlled by a second processor, where the first and second processors may or may not be in communication with each other.

The power source 1306 may be implemented with any device capable of providing energy to the electronic device 1300. For example, the power source 1306 may include one or more disposable or rechargeable batteries. Additionally or alternatively, the power source 1306 may include a power connector or power cord that connects the electronic device 1300 to another power source, such as a wall outlet.

The memory 1308 may store electronic data that may be used by the electronic device 1300. For example, the memory 1308 may store electrical data or content such as, for example, audio and video files, documents and applications, device settings and user preferences, timing signals, control signals, data structures or databases, image data, maps, or focus settings. The memory 1308 may be configured as any type of memory. By way of example only, the memory 1308 may be implemented as random access memory, read-only memory, Flash memory, removable memory, other types of storage elements, or combinations of such devices.

The electronic device 1300 may also include one or more sensors defining the sensor system 1310. The sensors may be positioned substantially anywhere on the electronic device 1300. The sensor(s) may be configured to sense substantially any type of characteristic, such as but not limited to, touch, force, pressure, electromagnetic radiation (e.g., light), heat, movement, relative motion, biometric data, distance, and so on. For example, the sensor system 1310 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology.

The I/O mechanism 1312 may transmit and/or receive data from a user or another electronic device. An I/O device may include a display, a touch sensing input surface such as a track pad, one or more buttons (e.g., a graphical user interface "home" button, or one of the buttons described herein), one or more cameras (including one or more image sensors), one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 1312 may also provide feedback (e.g., a haptic output) to a user.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An electronic device, comprising:
a set of components operable to generate at least one of an electrical signal or a magnetic signal;
an image sensor, including,
a pixel array;
a correlated double sampling (CDS) readout circuit associated with a pixel in the pixel array; and
an image sensor driver coupled to the pixel array and the CDS readout circuit and configured to,
receive an indication of a current state of the set of components; and
adjust a CDS time of the CDS readout circuit at least partly responsive to the indication of the current state of the set of components.

2. The electronic device of claim 1, wherein:
the set of components comprises wireless communications circuitry operable in different wireless communication modes; and
the current state of the set of components is at least partly dependent on a current wireless communication mode of the wireless communications circuitry.

3. The electronic device of claim 2, wherein the different wireless communication modes comprise at least:
a first wireless communication mode using a first wireless frequency range; and
a second wireless communication mode using a second wireless frequency range different from the first wireless frequency range.

4. The electronic device of claim 2, wherein the different wireless communication modes comprise:
a cellular radio wireless communication mode; and
a local area network wireless communication mode.

5. The electronic device of claim 2, wherein:
the set of components further comprises a power delivery system; and
the power delivery system is configured to provide power to both the image sensor and the wireless communications circuitry.

6. The electronic device of claim 1, wherein:
the set of components comprises a charging circuit; and
the current state of the set of components is at least partly dependent on a state of the charging circuit.

7. The electronic device of claim 1, wherein:
the set of components comprises a power delivery system; and
the current state of the set of components is at least partly dependent on a state of the power delivery system.

8. The electronic device of claim 1, wherein:
the set of components comprises an audio output device; and
the current state of the set of components is at least partly dependent on a state of the audio output device.

9. The electronic device of claim 1, wherein the image sensor driver only adjusts the CDS time between image capture frames of the pixel array.

10. The electronic device of claim 1, wherein the image sensor driver adjusts the CDS time before each image capture frame captured using the pixel array.

11. The electronic device of claim 1, wherein the indication of the current state of the set of components comprises a value or a signal state.

12. The electronic device of claim 1, further comprising:
a timing generator; and
a programmable delay circuit; wherein,
the CDS readout circuit includes an analog-to-digital converter (ADC) configured to receive an analog pixel value from the pixel;
the programmable delay circuit is configured to selectively add a delay to a timing signal provided by the timing generator for the ADC;
the image sensor driver is configured to program the programmable delay circuit at least partly responsive to the indication of the current state of the set of components; and
programming the programmable delay circuit adjusts the CDS time.

13. A method of reading a pixel value from an image sensor housed with a set of components, the method comprising:
determining a current state of the set of components;
adjusting, at least partly responsive to the current state of the set of components, a correlated double sampling (CDS) time; and
performing, in accordance with the adjusted CDS time, a CDS readout of at least one pixel in a pixel array of the image sensor.

14. The method of claim 13, wherein the CDS time is adjusted between image capture frames of the pixel array.

15. The method of claim 13, wherein the CDS time is adjusted before each image capture frame of the pixel array.

16. The method of claim 13, wherein:
the CDS readout comprises a reference readout portion and a signal readout portion; and
adjusting the CDS time comprises adjusting a start time of the signal readout portion of the CDS readout.

17. A correlated double sampling (CDS) readout circuit, comprising:
a timing generator;
an analog-to-digital converter (ADC) configured to receive,
an analog pixel value;
a reference ramp start signal from the timing generator; and
a data ramp start signal from the timing generator;
a programmable delay circuit configured to selectively add a delay to the data ramp start signal; and
an image sensor driver configured to program the programmable delay circuit at least partly responsive to a frequency of a noise signal; wherein,
the delay to the data ramp start signal adjusts a CDS time of the CDS readout circuit.

18. The CDS pixel readout circuit of claim 17, wherein a first granularity of the CDS time adjustment is finer than a second granularity of a clock signal received by the timing generator.

19. The CDS pixel readout circuit of claim 17, wherein the image sensor driver is configured to program the programmable delay circuit between image capture frames of an image sensor that provides the analog pixel value.

20. The CDS pixel readout circuit of claim 17, wherein the image sensor driver is configured to program the programmable delay circuit before each image capture frame of an image sensor that provides the analog pixel value.

\* \* \* \* \*